(12) United States Patent
Toda et al.

(10) Patent No.: US 12,242,952 B2
(45) Date of Patent: Mar. 4, 2025

(54) SYSTEM FOR DISTRIBUTED PROCESSING OF NODES

(71) Applicant: KABUSHIKI KAISHA TOSHIBA, Tokyo (JP)

(72) Inventors: Takeshi Toda, Kawasaki Kanagawa (JP); Kosuke Haruki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1288 days.

(21) Appl. No.: 16/129,161

(22) Filed: Sep. 12, 2018

(65) Prior Publication Data

US 2019/0188563 A1 Jun. 20, 2019

(30) Foreign Application Priority Data

Dec. 18, 2017 (JP) .................................. 2017-241778
Aug. 28, 2018 (JP) .................................. 2018-159500

(51) Int. Cl.
*G06N 3/08* (2023.01)
*G06F 17/18* (2006.01)
(Continued)

(52) U.S. Cl.
CPC ............... *G06N 3/08* (2013.01); *G06F 17/18* (2013.01); *G06N 3/045* (2023.01); *G06N 20/00* (2019.01)

(58) Field of Classification Search
CPC ........ G06N 3/08; G06N 3/0454; G06N 20/00; G06F 17/18
See application file for complete search history.

(56) References Cited

U.S. PATENT DOCUMENTS 8,768,870 B1 7/2014 Corrado et al.
9,355,067 B1 5/2016 Monga et al.
(Continued)

FOREIGN PATENT DOCUMENTS

JP 2017-514251 A 6/2017
JP 2018-036779 3/2018

OTHER PUBLICATIONS

Li et al., "Scaling Distributed Machine Learning with the Parameter Server", 2014, 11th USENIX Symposium on Operating Systems Design and Implementation (OSDI '14), pp. 583-598. (Year: 2014).*
(Continued)

*Primary Examiner* — Kamran Afshar
*Assistant Examiner* — Lokesha G Patel
(74) *Attorney, Agent, or Firm* — Finnegan, Henderson, Farabow, Garrett & Dunner, LLP

(57) ABSTRACT

According to one embodiment, in nth (n is a natural number) processing, a first node calculates a first gradient to update a first weight and a second node calculates a second gradient to update the first weight. In mth (m is a natural number) processing, a third node calculates a third gradient to update a third weight and a fourth node calculates a fourth gradient to update the third weight. If the calculation by the first and second nodes is faster than the calculation by the third and fourth nodes, in n+1th processing, a second weight updated from the first weight is further updated using the first and second gradients, and, in m+1th processing, a fourth weight updated from the third weight is further updated using the first to fourth gradients.

6 Claims, 12 Drawing Sheets

(51) Int. Cl.
*G06N 3/045* (2023.01)
*G06N 20/00* (2019.01)

(56) References Cited

U.S. PATENT DOCUMENTS

| | | | |
|---|---|---|---|
| 2013/0290223 A1* | 10/2013 | Chapelle | G06N 20/00 |
| | | | 706/12 |
| 2015/0294219 A1 | 10/2015 | Krizhevsky | |
| 2015/0324690 A1* | 11/2015 | Chilimbi | G06N 3/063 |
| | | | 706/27 |
| 2016/0267380 A1 | 9/2016 | Gemello et al. | |
| 2017/0185895 A1 | 6/2017 | Chen et al. | |
| 2017/0228645 A1 | 8/2017 | Wang et al. | |
| 2018/0069944 A1* | 3/2018 | Yang | H04L 41/5009 |
| 2018/0293493 A1* | 10/2018 | Kalamkar | G06T 1/20 |
| 2018/0295161 A1* | 10/2018 | Wu | H04L 65/1083 |
| 2019/0188563 A1* | 6/2019 | Toda | G06N 3/08 |

OTHER PUBLICATIONS

Chaudhari et al., "PARLE: Parallelizing Stochastic Gradient Descent", Sep. 10, 2017, arXiv:1707.00424v2, pp. 1-13. (Year: 2017).*
O. Dekel et al., "Optimal Distributed Online Prediction Using Mini-Batches," Journal of Machine Learning Research, vol. 13, pp. 165-204, arXiv:1012.1367v2 [cs.LG] (Jan. 31, 2012).

* cited by examiner

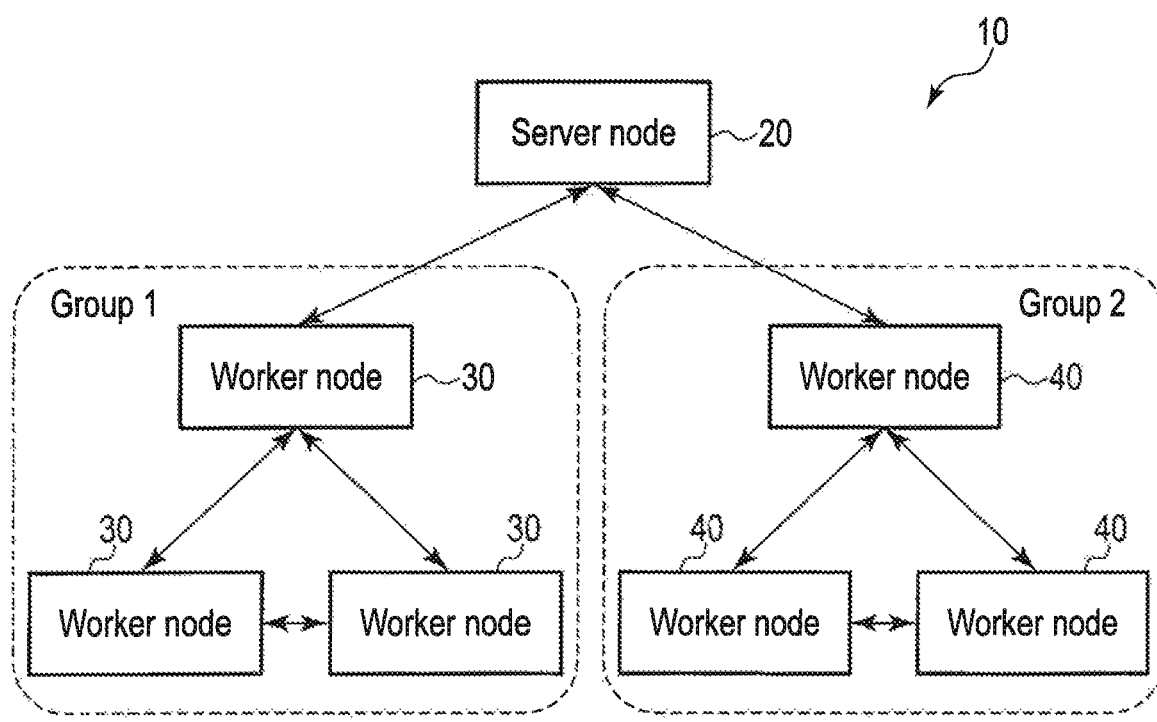
F I G. 2

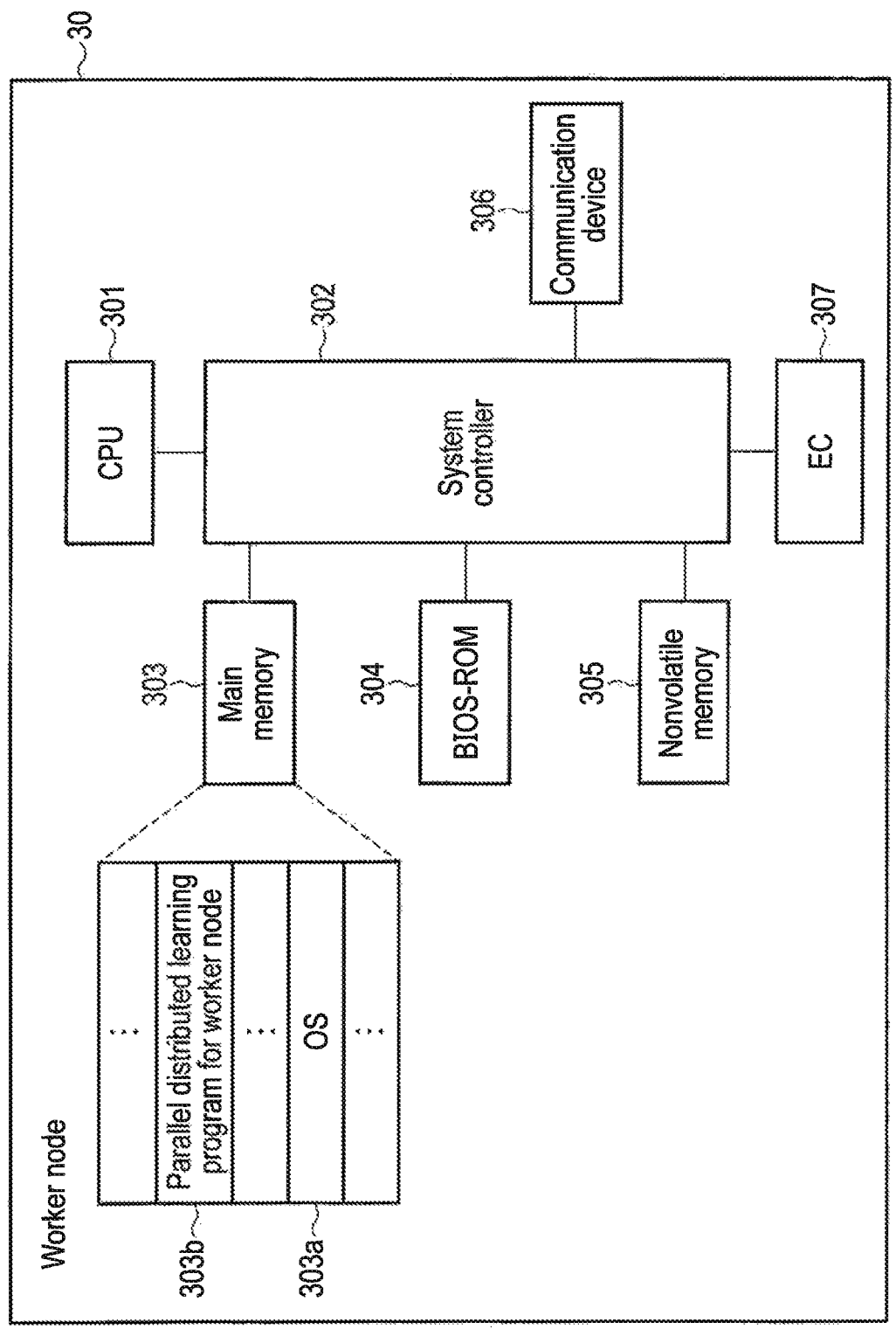
F I G. 4

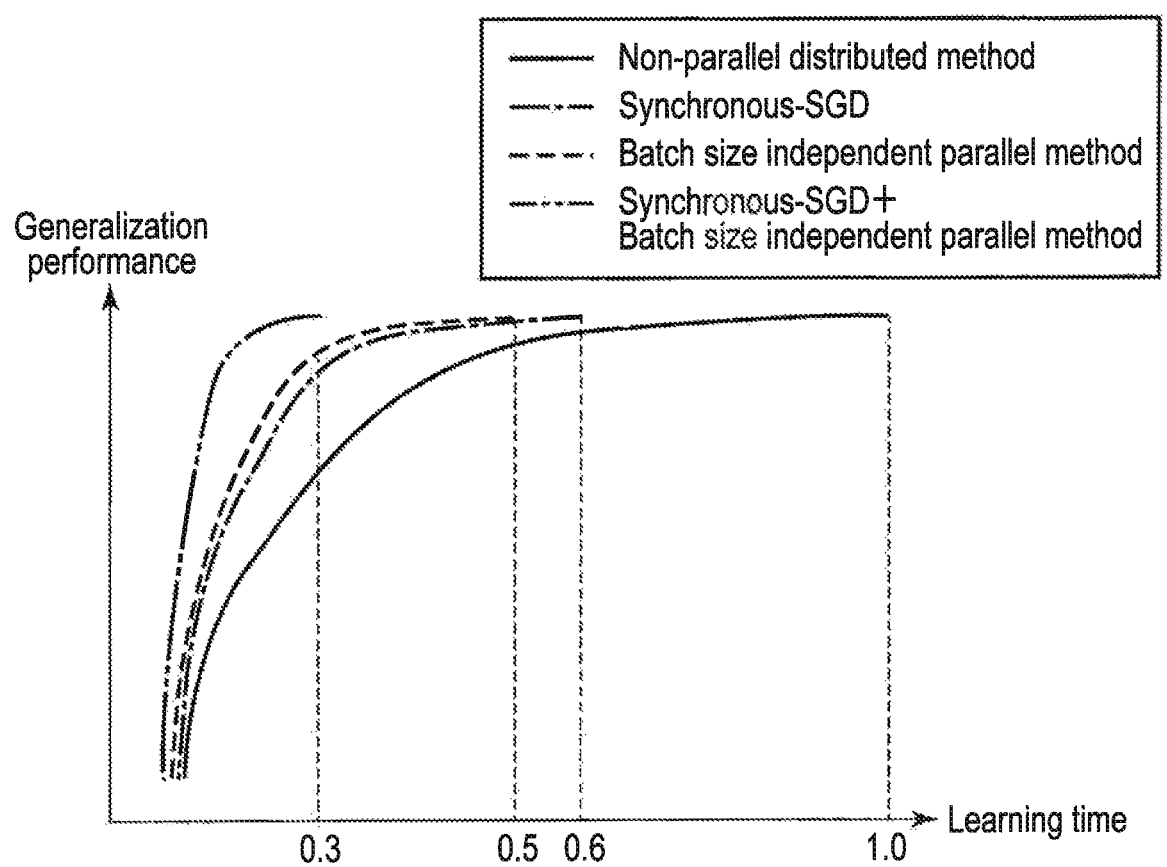
F I G. 10

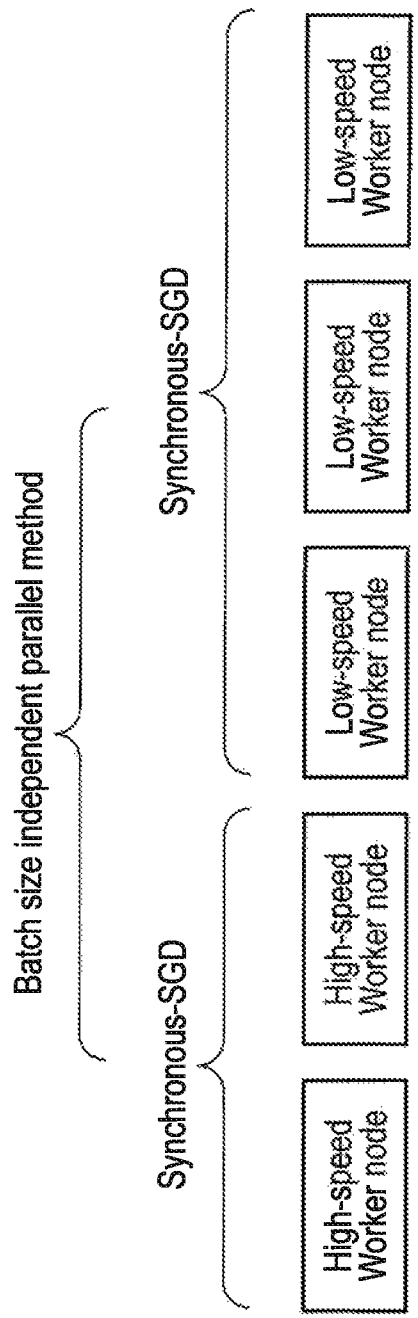
F I G. 11

SYSTEM FOR DISTRIBUTED PROCESSING OF NODES

CROSS-REFERENCE TO RELATED APPLICATIONS

This application is based upon and claims the benefit of priority from Japanese Patent Applications No. 2017-241778, filed Dec. 18, 2017; and No. 2018-159500, filed Aug. 28, 2018, the entire contents of all of which are incorporated herein by reference.

FIELD

Embodiments described herein relate generally to a a system.

BACKGROUND

In recent years, use of data through deep learning which is one of the machine learning techniques is anticipated. In the deep learning, in order to obtain results of the learning from massive data faster, parallel processing of data by a plurality of nodes (computers) must be performed to achieve parallel distributed learning processing in which the learning process of each node is shared by the nodes. In the parallel distributed learning processing, data indicative of learning processes are shared through the communication between the nodes.

Here, in order to obtain the results of learning faster, the number of nodes executing the parallel processing may be increased; however, in general parallel distributed learning processing, the results of learning may not be obtained effectively (that is, the speed of learning does not increase) in some cases even if the number of nodes is increased. Thus, a high scalability is difficult to achieve.

BRIEF DESCRIPTION OF THE DRAWINGS

FIG. 2 shows an example of the structure of the system.
FIG. 4 shows an example of the system structure of worker nodes.
FIG. 10 shows learning time to obtain a predetermined generalization performance in each learning method.
FIG. 11 shows an outline of a variation of the system.

DETAILED DESCRIPTION

Figure 1:
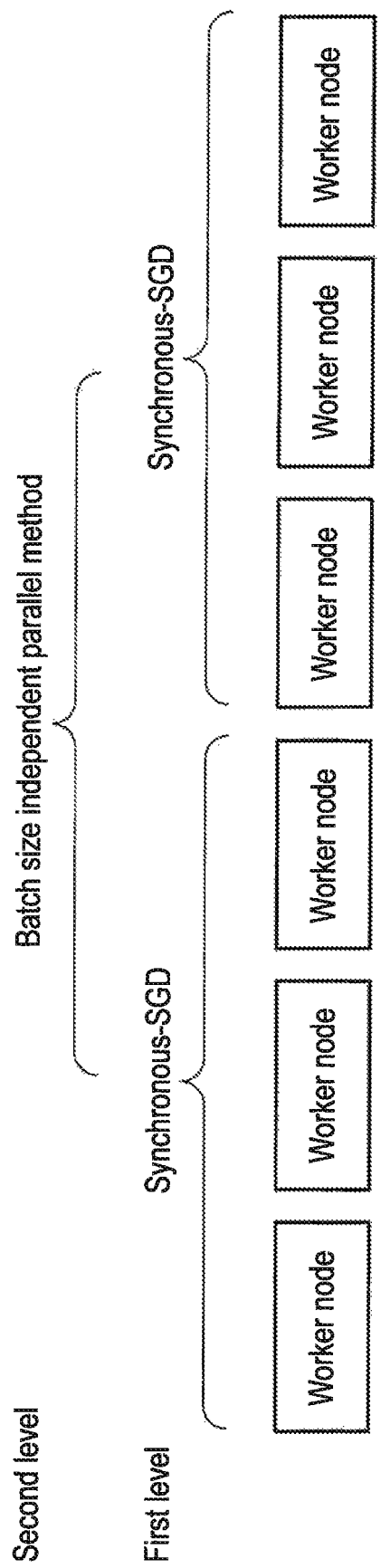
FIG. 1 shows an outline of a system of a first embodiment.

In general, according to one embodiment, a system includes a first node and a second node of a first group, and a third node and a fourth node of a second group. In a case where the first node and the second node perform nth (n is a natural number) parallel distributed processing, the first node is configured to calculate a first gradient to update a first weight of objective function to a second weight and the second node is configured to calculate a second gradient to update the first weight of the objective function to the second weight. In a case where the third node and the fourth node perform mth (m is a natural number) parallel distributed processing, the third node is configured to calculate a third gradient to update a third weight of the objective function to a fourth weight and the fourth node is configured to calculate a fourth gradient to update the third weight of the objective function to the fourth weight. If the calculation of gradient by the first node and the second node is faster than the calculation of gradient by the third node and the fourth node, in n+1th parallel distributed processing performed by the first node and the second node, the second weight updated from the first weight is further updated using the first and second gradients, and, in m+1th parallel distributed processing performed by the third node and the fourth node, the fourth weight updated from the third weight is further updated using the first to fourth gradients.

Various embodiments will be described hereinafter with reference to accompanying drawings.

First Embodiment

A system of the present embodiment performs parallel distributed learning processing using an objective function as a reference in deep learning using massive data, for example. Note that the parallel distributed learning processing using an objective function as a reference may be any type of processing which uses an objective function as a feedback (evaluation value) of results of learning and performs learning by a plurality of processing subjects, and includes, for example, parallel distributed learning processing which optimizes an objective function.

Note that, in the deep learning, a stochastic gradient decent (SGD) method is used as a method to optimize an objective function, for example. In the SGD method, parameters of objective function are updated repeatedly using a vector to an optimized solution direction, which will be referred to as a gradient (vector). Note that the parameters of objective function include a weight, for example.

When a weight (weight vector) indicative of a current condition of SGD, gradient vector, and learning rate are represented as $W^{(t)}$, $\nabla W^{(t)}$, and $\varepsilon^{(t)}$, weight $W^{t+1}$ after the update will be obtained through the following formula.

$$W^{(t+1)} = W^{(t)} - \varepsilon^{(t)} \nabla W^{(t)} \quad \text{Formula (1)}$$

Note that the learning rate $\varepsilon^{(t)}$ which determines an update width is adoptively determined corresponding to the progress of learning, and, for example, is decreased corresponding to the progress of learning.

The gradient is obtained by inputting training data to the objective function, and in general, a mini batch method in which a plurality of training data are input together to obtain an average gradient is used in consideration of calculation costs. The number of training data used to obtain the average gradient will be referred to as batch size. As the learning processes shared in parallel distributed optimization by the SGD, gradient will be used, for example.

Here, as a main algorithm of parallel distributed learning, a synchronized parallel distributed learning method and a non-synchronized parallel distributed learning method are available, for example.

In the parallel distributed learning process, a plurality of nodes perform calculation of gradient, and in the synchronized parallel distributed learning method, the nodes perform the calculation of gradient in synchronization. Specifically, the synchronized parallel distributed learning method is, for example, Synchronous-SGD in which the calculation of gradient of the mini batch method is dispersed in the nodes and an average value of the gradients calculated by the all nodes is used for update of weight. Note that there are several types of Synchronous-SGD, and there are, for example, a collective communication type in which gradients are shared in all nodes and a parameter server type in which gradients are gathered in a node which is referred to as a parameter server to perform updating of the weight and the updated weight is distributed to each node.

In the synchronized parallel distributed learning method, when the number of nodes (parallel numbers) calculating the gradient increases, costs for synchronization increase and the process throughput decreases, and when the number of nodes increases, the batch size increases and generalization performance decreases, and the whole process speed is influenced by the process speed of nodes of slow process speed.

On the other hand, in the non-synchronized parallel distributed learning method, a plurality of nodes perform calculation of gradient in a non-synchronized manner. Specifically, the non-synchronized parallel distributed learning method is, for example, Asynchronous-SGD which is an algorithm sharing the gradients as in the Synchronous-SGD. However, in the Asynchronous-SGD, gradients are not averaged by synchronization, and the weight is updated using the gradients calculated by the nodes as they are. Note that a parameter server type is mainly used as the Asynchronous-SGD.

In the non-synchronized parallel distributed learning method, high process throughput is obtained as compared to the synchronized parallel distributed learning method while there is a limit Lo its scalability since the convergence speed decreases because of a different between process speeds of the nodes.

Note that Asynchronous-SGD which has a different approach than Synchronous-SGD is, unlike the Synchronous-SGD, a parallel distributed learning algorithm which does not depend on batch size, and thus, may be referred to as a batch size independent parallel method (processing) or the like. Note that the batch size independent parallel method is basically the non-synchronized parallel distributed learning method.

Now, the outline of the system of the present embodiment (hereinafter referred to as present system) will be explained with reference to FIG. 1. The present system is configured to perform different learning processes (for example, Synchronous-SD and other batch size independent parallel methods) in some levels, in the parallel distributed learning process.

Specifically, as shown in FIG. 1, mini batch method parallel distributed processing is performed by Synchronous-SGD in each group of nodes in a first level and batch size independent parallel distributed processing is performed by representative nodes of the groups of the first level in a second level. Hereinafter, the present system will be explained in detail.

FIG. 2 shows an example of the structure of the present system. As shown in FIG. 2, the present system 10 includes a server node 20, a plurality of worker nodes 30, and a plurality of worker nodes 40.

In the present embodiment, the worker nodes 30 are in a group 1, and the worker nodes 40 are in a group 2.

The server node 20 is communicatively connected to one of the worker nodes 30 of group 1 (hereinafter referred to as representative node 30 of group 1). Furthermore, the server node 20 is communicatively connected to one of the worker nodes 40 of group 2 (hereinafter referred to as representative node 40 of group 2).

Note that, in the worker nodes 30, the worker nodes 30 which are not communicatively connected to the server node 20 (that is, the worker nodes 30 other than the representative node 30 of group 1) will be referred to as non-representative node 30 of group 1. Furthermore, in the worker nodes 40, the worker nodes 40 which are not communicatively connected to the server node 20 (that is, the worker nodes 40 other than the representative node 40 of group 2) will be referred to as non-representative node 40 of group 2.

In group 1, the worker nodes 30 (representative node 30 and non-representative nodes 30) are communicatively connected together. Similarly, in group 2, the worker nodes 40 (representative node 40 and non-representative nodes 40) are communicatively connected together.

In the present embodiment, in the first level, parallel distributed learning processing of mini batch method is performed by Synchronous-SGD in group 1 (worker nodes 30) and group 2 (worker nodes 40). Furthermore, in the second level, parallel distributed learning processing of batch size independent parallel distributed method is performed between the representative node 30 of group 1 and the representative node 40 of group 2 through the server node 20.

Note that, while FIG. 2 shows an example in which three worker nodes are included in each of groups 1 and 2, the number of worker nodes may be two or more in each of the groups 1 and 2. Furthermore, while FIG. 2 shows only two groups (groups 1 and 2), the number of groups may be three or more in the present system.

Figure 3:
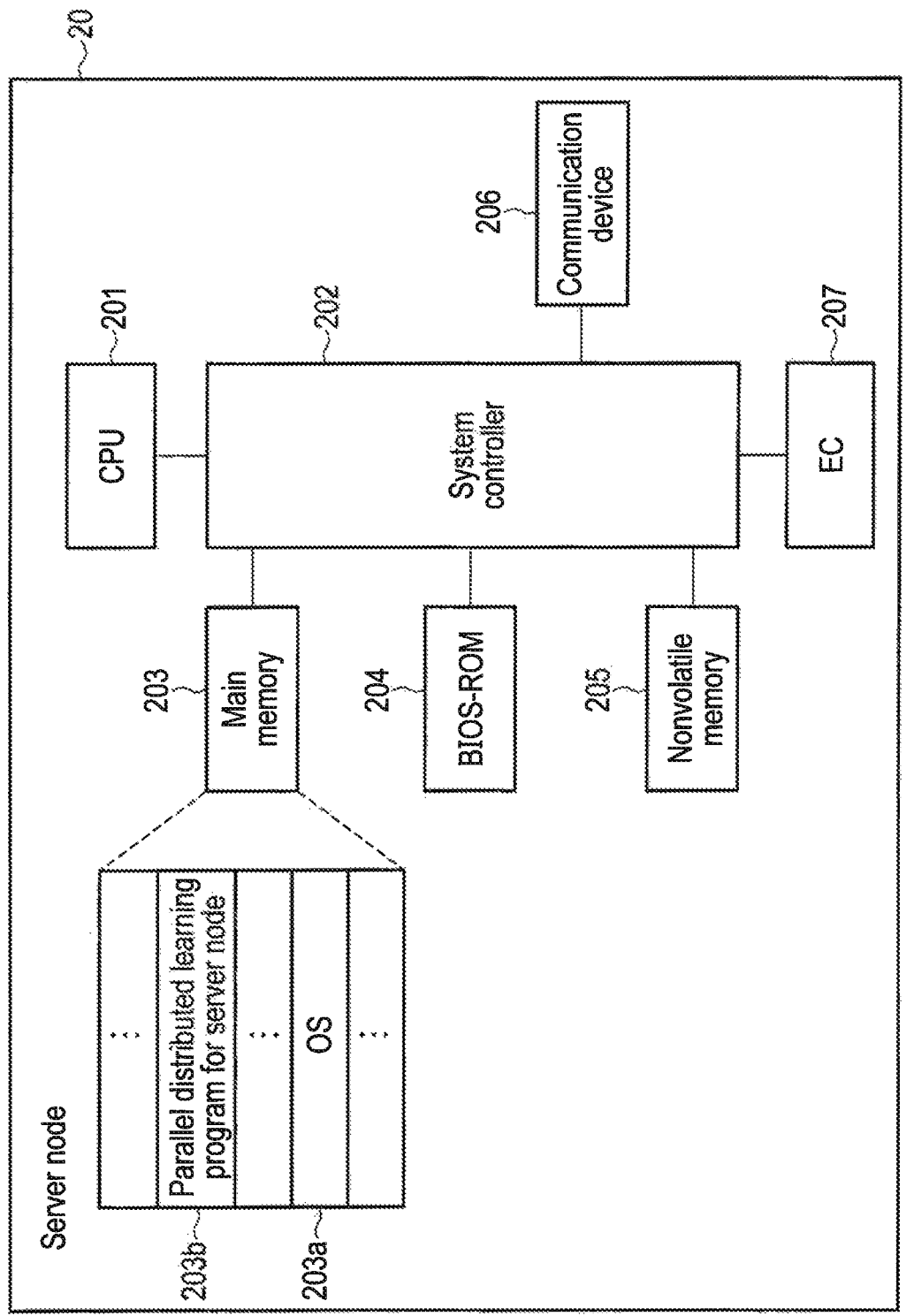
FIG. 3 shows an example of the system structure of a server node.

FIG. 3 shows an example of the system structure of the server node 20 of FIG. 2. The server node 20 includes, for example, CPU 201, system controller 202, main memory 203, BIOS-ROM 204, nonvolatile memory 205, communication device 206, and embedded controller (EC) 207.

CPU 201 is a hardware processor configured to control operations of various components in the server node 20. CPU 201 executes various programs loaded to the main memory 203 from the nonvolatile memory 205 which is a storage device. The programs include operating system (OS) 203a, and various application programs. The application programs include a parallel distributed learning program 203b for server node.

Furthermore, CPU 201 executes basic input/output system (BIOS) stored in BIOS-ROM 204. BIOS is a program for hardware control.

The system controller 202 is a device connecting between a local bus of CPU 201 and various components. The system controller 202 includes a memory controller for access control of the main memory 203.

The communication device 206 is a device configured to execute wired or wireless communication. The communication device 206 includes a transmitter configured to transmit signals and a receiver configured to receive signals. The EC 207 is a one-chip microcomputer including an embedded controller for power management.

FIG. 4 shows an example of the system structure of the worker node 30. Note that, although only the system structure of the worker node 30 will be explained, the worker node 40 has a similar structure.

The worker node 30 includes, for example, CPU 301, system controller 302, main memory 303, BIOS-ROM 304, nonvolatile memory 305, communication device 306, and embedded controller (EC) 307.

CPU 301 is a hardware processor configured to control operations of various components in the worker node 30. CPU 301 executes various programs loaded to the main memory 303 from the nonvolatile memory 305 which is a storage device. The programs include operating system (OS) 303a, and various application programs. The application programs include a parallel distributed learning program 303b for worker node.

Furthermore, CPU 301 executes basic input/output system (BIOS) stored in BIOS-ROM 304. BIOS is a program for hardware control.

The system controller 302 is a device connecting between a local bus of CPU 301 and various components. The system controller 302 includes a memory controller for access control of the main memory 303.

The communication device 306 is a device configured to execute wired or wireless communication. The communication device 306 includes a transmitter configured to transmit signals and a receiver configured to receive signals. The EC 307 is a one-chip microcomputer including an embedded controller for power management.

Figure 5:
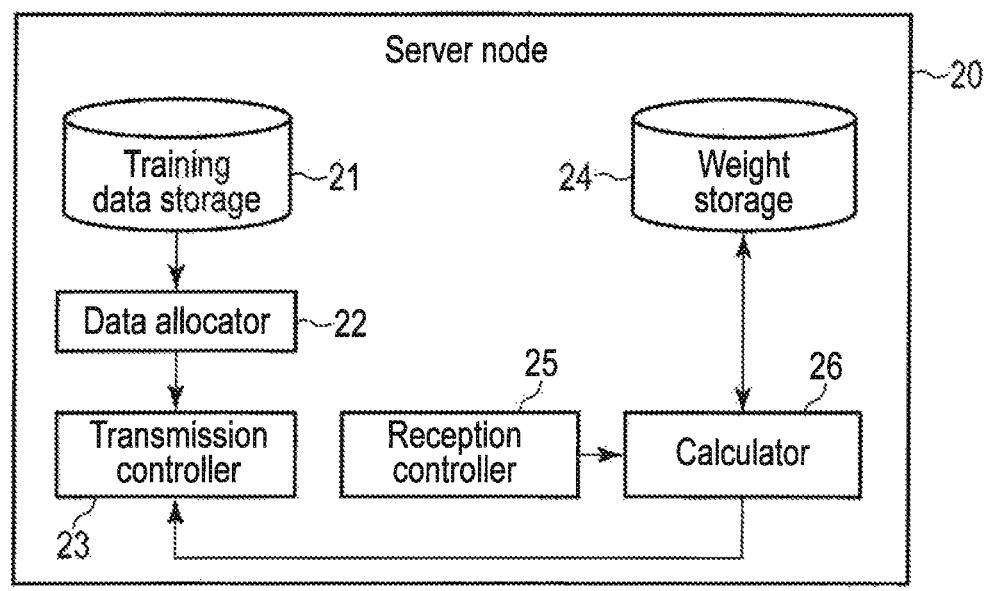
FIG. 5 is a block diagram of an example of the functional structure of the server node.

FIG. 5 is a block diagram of an example of the functional structure of server node 20. As shown in FIG. 5, the server node 20 includes a training data storage 21, data allocator 22, transmission controller 23, weight storage 24, reception controller 25, and calculator 26.

In the present embodiment, the training data storage 21 and the weight storage 24 are stored in the nonvolatile memory 205 shown in FIG. 3 or the like. Furthermore, in the present embodiment, the data allocator 22, transmission controller 23, reception controller 25, and calculator 26 are achieved by, for example, CPU 201 shown in FIG. 3 (that is, computer of server node 20) executing the parallel distributed learning program 203b (that is, software) stored in the nonvolatile memory 205. Note that the parallel distributed learning program 203b can be distributed as preliminarily being stored in a computer readable memory medium. Furthermore, the parallel distributed learning program 203b may be downloaded in the server node 20 through a network, for example.

In this example, the components 22, 23, 25, and 26 are achieved by software; however, the components 22, 23, 25, and 26 may be achieved by hardware or by a combination of software and hardware.

The training data storage 21 stores training data used for calculation of gradient by each node (worker node) in the parallel distributed learning processing.

The data allocator 22 determines training data to be allocated to each of the worker nodes 30 and 40 from the training data stored in the training data storage 21. The data allocator 22 divides the training data stored in the training data storage 21 into two parts, and allocates the divided training data to group 1 (specifically, the worker nodes 30 thereof) and group 2 (specifically, the worker nodes 40 thereof).

The transmission controller 23 includes a function to transmit various data through the communication device 206. The transmission controller 23 transmits the training data allocated to group 1 (the worker nodes 30 thereof) by the data allocator 22 to the representative node 30 of group 1. Furthermore, the transmission controller 23 transmits the training data allocated to group 2 (the worker nodes 40 thereof) by the data allocator 22 to the representative node 40 of group 2.

The weight storage 24 stores the weight of objective function. Note that the weight stored in the weight storage 24 (that is, the weight managed by the server node 20) is referred to as a master parameter.

The reception controller 25 includes a function to receive various data through the communication device 206. The reception controller 25 receives gradient indicative of learning process on each of the worker nodes 30 and 40. The gradient received by the reception controller 25 is calculated by each of the worker nodes 30 and 40 to update weight. The gradient calculated by each of the worker nodes 30 of group 1 is received from the representative node 30 of group 1. The gradient calculated by each of the worker nodes 40 of group 2 is received from the representative node 40 of group 2.

The calculator 26 updates the master parameter using the weight (master parameter) stored in the weight storage 24 and the gradient received from the reception controller 25. In that case, the calculator 26 calculates the weight after update using the above Formula (1). The weight (weight after update) calculated by the calculator 26 is stored in the weight storage 24 as the master parameter, and is transmitted to the representative node 30 of group 1 or the representative node 40 of group 2 by the transmission controller 23.

Hereinafter, the functional structure of the worker nodes 30 and 40 will be explained. Now, an example of the functional structure of the representative node 30 of group 1 will be explained with reference to FIG. 6.

Figure 6:
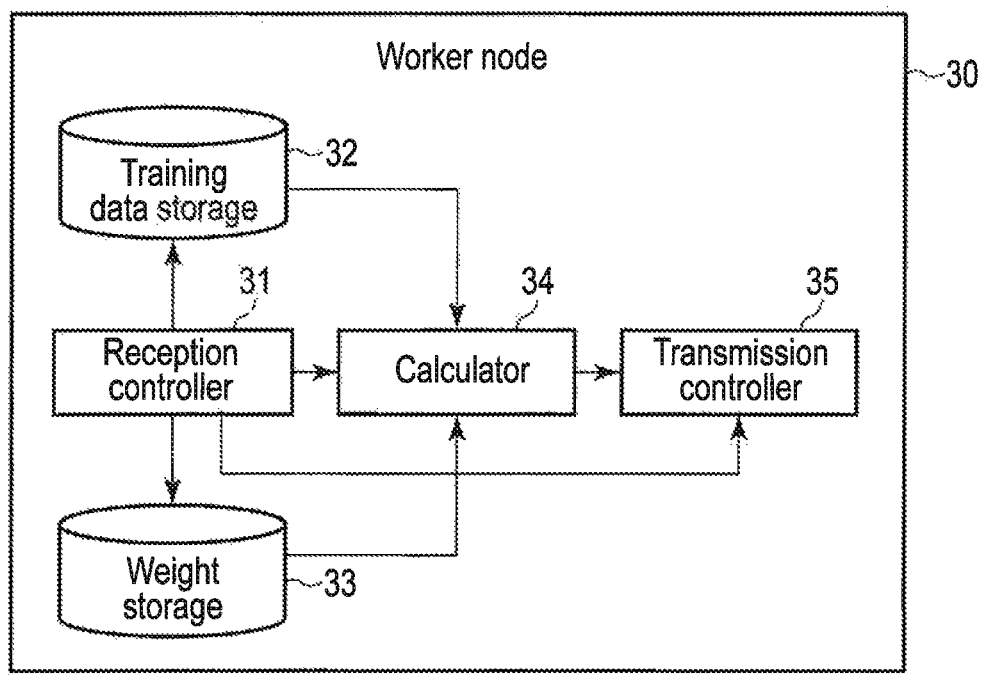
FIG. 6 is a block diagram of an example of the functional structure of the worker nodes.

As shown in FIG. 6, the representative node 30 of group 1 includes a reception controller 31, training data storage 32, weight storage 33, calculator 34, and transmission controller 35.

In the present embodiment, the reception controller 31, calculator 34, and transmission controller 35 are achieved by, for example, CPU 301 of FIG. 4 (that is, computer of representative node 30) executing the parallel distributed learning program 303b stored in the nonvolatile memory 305 (that is, software). Note that the parallel distributed learning program 303b can be distributed as preliminarily being stored in a computer readable storage medium. Furthermore, the parallel distributed learning program 303b may be downloaded in the representative node 30 through a network, for example.

In this example, the components 31, 34, and 35 are achieved by software; however, the components 31, 34, and 35 may be achieved by hardware or by a combination of software and hardware.

Furthermore, in the present embodiment, the training data storage 32 and the weight storage 33 are stored in the nonvolatile memory 305 shown in FIG. 4 or the like.

The reception controller 31 includes a function to receive various data through the communication device 306. The reception controller 31 receives training data transmitted from the transmission controller 23 included in the server node 20. In the training data received by the reception controller 31, the training data allocated to the representative node 30 of group 1 are stored in the training data storage 32. On the other hand, in the training data received by the reception controller 31, the training data allocated to the non-representative nodes 30 of group 1 are transmitted from the representative node 30 of group 1 to the non-representative nodes 30.

Furthermore, the reception controller 31 receives the gradient calculated by the non-representative nodes 30 of group 1 therefrom.

The weight storage 33 stores the weight of objective function. Note that the weight stored in the weight storage 33 (that is, the weight managed by the representative node 30) will be referred to as the weight of representative node 30 of group 1 for easier understanding.

The calculator 34 calculates the gradient used for updating of the weight of objective function using the training data stored in the training data storage 32 and the weight stored in the weight storage 33.

The transmission controller 35 includes a function to transmit various data through the communication device 306. The transmission controller 35 transmits the gradient received by the reception controller 31 (gradient calculated by the non-representative nodes 30) and the gradient calculated by the calculator 34 to the server node 20.

Note that, as described above, if the weight calculated by the calculator 26 included in the server node 20 is transmitted from the server node 20 (transmission controller 23), the weight is received by the reception controller 31 and is replaced with the weight stored in the weight storage 33 (weight before update). Thus, the weight of the representative node 30 of group 1 is updated. Furthermore, the weight is transmitted to the non-representative nodes 30 through the transmission controller 35.

Now, an example of the functional structure of the non-representative node 30 of group 1 will be explained. The functional structure of the non-representative node 30 of group 1 will be explained with reference to FIG. 6 for easier understanding, and the structures different from those of the above representative node 30 of group 1 will be mainly explained.

The non-representative node 30 of group includes, as in the above representative node 30 of group 1, a reception controller 31, training data storage 32, weight storage 33, calculator 34, and transmission controller 35.

The reception controller 31 receives training data transmitted from the representative node 30 of group 1. The training data received by the reception controller 31 are stored in the training data storage 32.

The weight storage 33 stores the weight of objective function. Note that the weight stored in the weight storage 33 (that is, the weight managed by the non-representative node 30) will be referred to as the weight of non-representative node 30 of group 1 for easier understanding.

As described above, if the weight (weight after update) is transmitted from the representative node 30 of group 1, the weight is received by the reception controller 31 and is replaced with the weight stored in the weight storage 33 (weight before update). Thus, the weight of the non-representative node 30 of group 1 is updated.

The calculator 34 calculates the gradient used for updating of the weight of objective function using the training data stored in the training data storage 32 and the weight stored in the weight storage 33. The gradient calculated by the calculator 34 is transmitted to the representative node 30 by the transmission controller 35.

In this example, the representative node 30 and the non-representative node 30 of group 1 are explained, and the same functional structures apply to the representative node 40 and the non-representative node 40 of group 2. Thus, in the following description, the functional structure of the representative node 40 and the non-representative node 40 of group 2 will be explained with reference to FIG. 6.

Hereinafter, an example of the process flow of present system will be explained with reference to the sequence chart of FIG. 7. Note that the process between the server node 20, group 1 (worker nodes 30), and group 2 (worker nodes 40) will be explained mainly, and the process of worker nodes of each group (group 1 and group 2) will be explained later.

Note that, the training data allocated to each of the worker nodes 30 of group 1 are stored in the training data storage 32 included in the worker nodes 30. The same applies to the worker nodes 40 of group 2.

Furthermore, the same weight (hereinafter referred to as weight W0) is stored in the weight storage 24 included in the server node 20 and the weight storage 33 included in each of the worker nodes 30 and 40.

In that case, a gradient calculation process is performed in group 1 (the worker nodes 30 thereof) (Step S1). In this gradient calculation process, each of the worker nodes 30 of group 1 calculates the gradient to update the weight of objective function using the training data stored in the training data storage 32 included in the worker nodes 30 and the weight W0 stored in the weight storage 33. Note that the worker nodes 30 of group 1 execute the gradient calculation process in synchronization.

The gradient calculated by the worker nodes 30 in step S1 is transmitted to the server node 20 from the representative node 30 of group 1 (step S2).

The server node 20 (the reception controller 25 therein) receives the gradient transmitted in step S2. The server node 20 (the calculator 26 therein) calculates a new weight (hereinafter referred to as weight W1) using the received gradient and the weight W0 stored in the weight storage 24 included in the server node 20. Thus, the weight W0 stored in the weight storage 24 is updated to the calculated weight W1 (step S3).

The server node 20 (the transmission controller 23) distributes the weight W1 updated from the weight W0 in step S3 (master parameter after update) to group 1 (step S4).

As above, the weight W1 distributed from the server node 20 is stored in the weight storage 33 included in each of the worker nodes 30 of group 1. In that case, in group 1, the following gradient calculation process can be performed using the weight to which the gradient calculated by group 1 is reflected.

On the other hand, in group 2 (the worker nodes 40 thereof), the gradient calculation process is performed as in group 1 (step S5). Through the gradient calculation process, each of the worker nodes 40 of group 2 calculates the gradient to update the weight of objective function using the training data stored in the training data storage 32 included in the worker nodes 40 and the weight W0 stored in the weight storage 33. Note that the worker nodes 40 of group 2 execute the gradient calculation process in synchronization.

The gradient calculated in step S5 is transmitted from the representative node 40 of group 2 to the server node 20 (step S6).

The server node 20 receives the gradient transmitted in step S6. Here, the weight (master parameter) stored in the weight storage 24 included in the server node 20 is the weight W1 updated in step S3.

Thus, the server node 20 calculates a new weight (hereinafter referred to as weight W2) using the received gradient and the weight W1. Thus, the weight W1 stored in the weight storage 24 is updated to the calculated weight W2 (step S7).

The server node 20 distributes the weight W2 (master parameter) updated from the weight W1 in step S7 to group 2 (step S8).

The weight W2 distributed from the server node 20 is stored in the weight storage 33 included in each of the worker nodes 40 of group 2.

Here, the weight W2 is updated using the gradient calculated in group 2 from the weight W1 which is updated using gradient calculated in group 1. That is, the weight W2 is a weight calculated using the gradient calculated in group 1 (gradient calculated in step S1) and the gradient calculated in group 2 (gradient calculated in step S5). As in this case, when the calculation of gradient by group 1 is faster than the calculation of gradient by group 2, parallel distributed learning processing is performed in group 2 using the weight updated using the gradient calculated by group 1.

Therefore, in group 2, the following gradient calculation process can be performed using the weight to which not only the gradient calculated by group 2 but also the gradient calculated by group 1 are reflected.

Furthermore, when steps S1 to S4 are performed, in group 1, steps S9 to S12 corresponding to steps S1 to S4 are performed. In these steps, the weight W2 is updated to a new weight (hereinafter referred to as weight W3) using the gradient calculated in the gradient calculation process in group 1 and the weight W2 stored in the weight storage 24 included in the server node 20. The weight W3 is distributed to the worker nodes 30 of group 1. Note that, in step S9, the gradient is calculated using training data which are different from the training data used in the gradient calculation process in step S1.

Here, the weight W3 is further updated using the gradient calculated in group 1 from the weight W2 which is updated using gradient calculated in group 2. As in this case, when the calculation of gradient by group 2 is faster than the calculation of gradient by group 1, parallel distributed learning processing is performed in group 1 using the weight updated using the gradient calculated by group 2.

Therefore, in group 1, the following gradient calculation process can be performed using the weight to which not only the gradients calculated by group 1 (gradients calculated in steps S1 and S9) but also the gradient calculated by group 2 (gradient calculated in step S5) are reflected.

On the other hand, when steps S5 to S8 are performed, in group 2, steps S13 to S16 corresponding to steps S5 to S8 are performed. In these steps, the weight W3 is updated to a new weight (hereinafter referred to as weight W4) using the gradient calculated in the gradient calculation process in group 2 and the weight W3 stored in the weight storage 24 included in the server node 20. The weight W4 is distributed to the worker nodes 40 of group 2. Note that, in step S13, the gradient is calculated using training data which are different from the training data used in the gradient calculation process in step S5.

Here, the weight W4 is updated using the gradient calculated in group 2 from the weight W3 which is updated using gradient calculated in group 1.

Therefore, in group 2, the following gradient calculation process can be performed using the weight to which not only the gradients calculated by group 2 (gradients calculated in steps S5 and S13) but also the gradients calculated by group 1 (gradients calculated in steps S1 and S9) are reflected.

Figure 7:
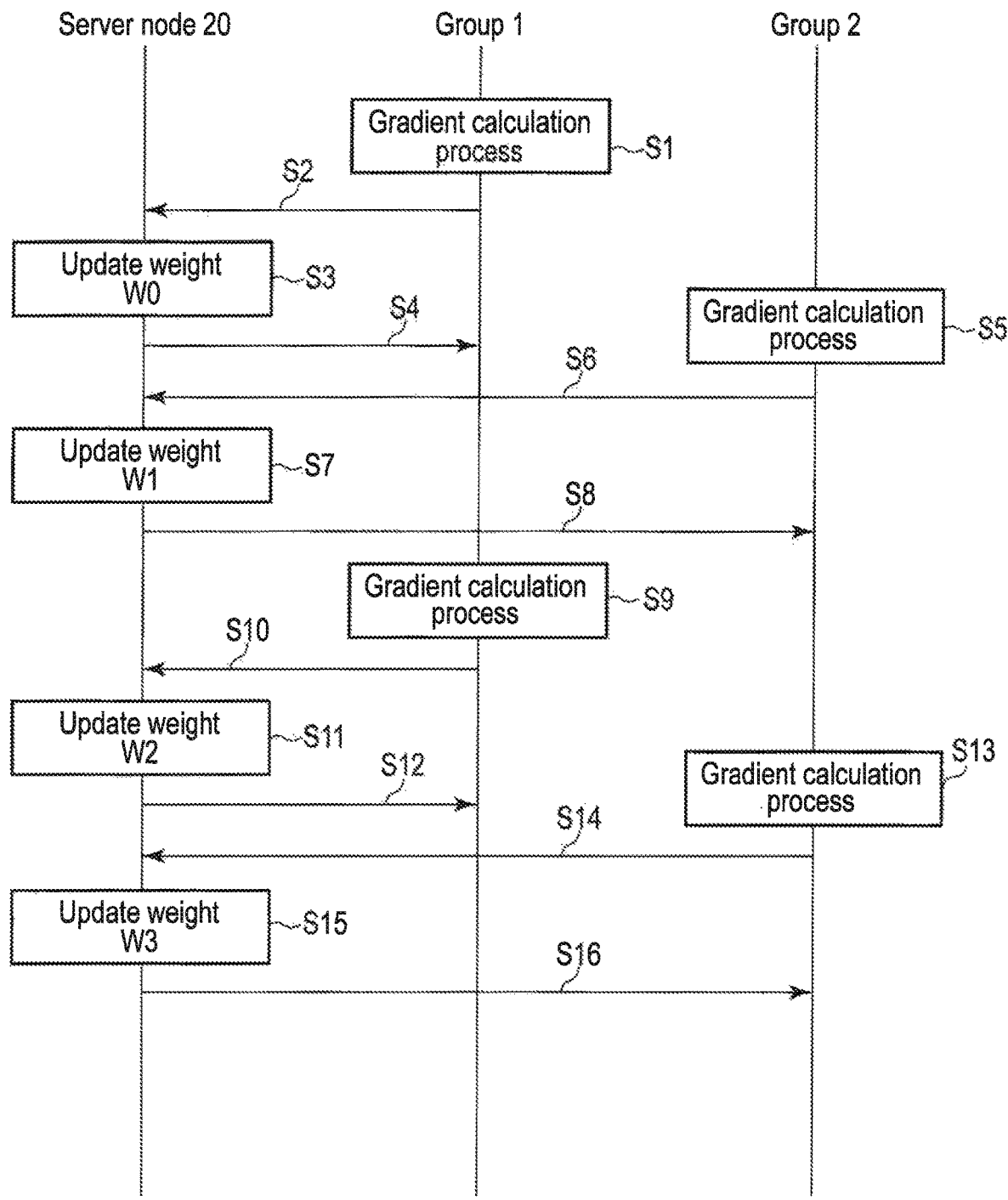
FIG. 7 is a sequence chart of an example of a process of the system.

FIG. 7 shows steps S1 to S16; however, the process of FIG. 7 is performed repeatedly until the gradient calculation process (that is, parallel distributed learning process) is performed to all of the training data stored in the training data storage 32 of each of the worker nodes 30 and 40.

As described above, in the present embodiment, the process is performed in groups 1 and 2 in synchronization while the process between the server node 20 and group 1 (the representative node 30 thereof) and the server node 20 and group 2 (the representative node 40 thereof) are performed in non-synchronization.

Now, the processes of the representative node and the non-representative node of each group when the process of FIG. 7 is performed will be explained.

Initially, an example of the process flow of the representative node will be explained with reference to the flowchart of FIG. 8. Here, the process flow of the representative node 30 of group 1 will be explained.

The calculator 34 included in the representative node 30 calculates a gradient using the training data stored in the training data storage 32 and the weight (for example, weight W0) stored in the weight storage 33 (step S21). Hereinafter, the gradient calculated by the representative node 30 will be referred to as gradient of representative node 30.

Note that, when the representative node 30 of group 1 performs the process of step S21, the non-representative nodes 30 of group 1 calculate a gradient in synchronization with the representative node 30. Hereinafter, the gradient calculated by the non-representative nodes 30 will be referred to as gradient of non-representative node 30.

In that case, the reception controller 31 receives the gradient of non-representative node 30 therefrom (step S22). Note that, in the present system, if the non-representative nodes 30 are in group 1, the reception controller 31 receives a gradient from each of the non-representative nodes 30.

Then, the calculator 34 calculates an average value of the gradient calculated in step S21 (gradient of representative node 30) and the gradient received in step S22 (gradient of non-representative node 30) (step S23). Hereinafter, the average value of the gradients calculated in step S23 will be referred to as average gradient.

The transmission controller 35 transmits the average gradient of group 1 to the server node 20 (step S24).

Note that steps S21 to S24 are performed by the representative node 30 of group 1 in steps S1 and S2 (of steps S9 and S10) of FIG. 7.

In that case, the process of steps S3 and S4 shown in FIG. 7 are performed by the server node 20. That is, in the server node 20, the master parameter is updated with the average gradient of group 1 transmitted in step S24, and the master parameter (for example, weight W1) after the update is transmitted from the server node 20 to the representative node 30 of group 1.

When the master parameter is transmitted form the server node 20, the reception controller 31 receives the master parameter (step S25).

The transmission controller 35 transmits the master parameter received in step S25 to the non-representative node 30 (step S26).

The weight (for example, weight W0) stored in the weight storage 33 is replaced with the master parameter received in step S25 (for example, weight W1) (step S27). Thus, the weight of representative node 30 of group 1 is updated to the master parameter (the weight corresponding thereto).

Note that steps S25 to S27 are performed by the representative node 30 after the process of step S4 (or step S12) of FIG. 7.

Figure 8:
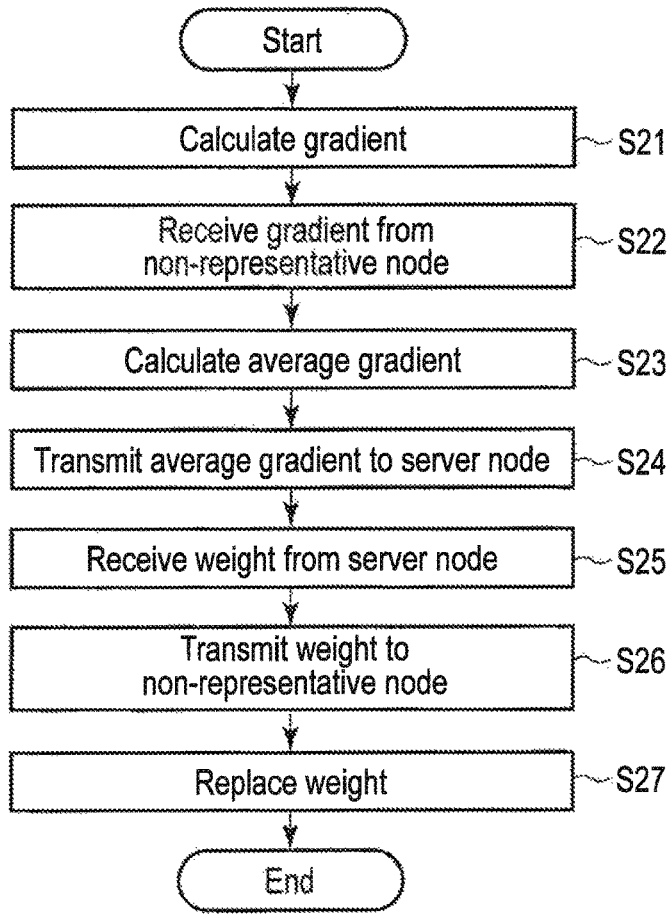
FIG. 8 is a flowchart of an example of a process of a representative node.

When the process of FIG. 8 is performed, the weight of representative node 30 of group 1 is updated to the weight calculated using the average gradient of group 1, and in the following calculation of gradient, the updated weight can be used.

Note that, although this is not shown, the process of FIG. 8 is performed repeatedly while the process of FIG. 7 is continued.

Now, an example of the process flow of non-representative node will be explained with reference to the flowchart of FIG. 9. Here, the process flow of non-representative node 30 of group 1 will be explained.

The calculator 34 included in the non-representative node 30 calculates a gradient using the training data stored in the training data storage 32 and the weight (for example, weight W0) stored in the weight storage 33 in synchronization with the calculation of gradient in the representative node 30 (step S31).

When the process of step S31 is performed, the transmission controller 35 transmits the gradient calculated in step S31 (gradient of non-representative node 30) to the representative node 30 (step S32).

Note that the process of steps S31 and S32 are performed by the non-representative node 30 in steps S1 and S2 (or in steps S9 and S10) of FIG. 7.

When the process of step S32 is performed, in the representative node 30, the process of steps S22 to S26 of FIG. 8 are performed. In that case, the master parameter (for example, weight W1) transmitted from the server node 20 is transmitted from the representative node 30 of group 1 to the non-representative node 30.

When the master parameter is transmitted from the representative node 30, the reception controller 31 receives the master parameter (step S33).

The weight (for example, weight W0) stored in the weight storage 33 is replaced with the master parameter received in step S33 (step S34). Thus, the weight of non-representative node 30 of group 1 is updated to the master parameter (the weight corresponding thereto).

Note that the process of steps S33 and S34 is performed by the non-representative node 30 after the process of step S4 (or step S12) of FIG. 7.

Through the process of FIG. 9, the weight of non-representative node 30 of group 1 is updated to the weight calculated using the average gradient of group 1, and in the following calculation of gradient, the updated weight can be used.

Figure 9:
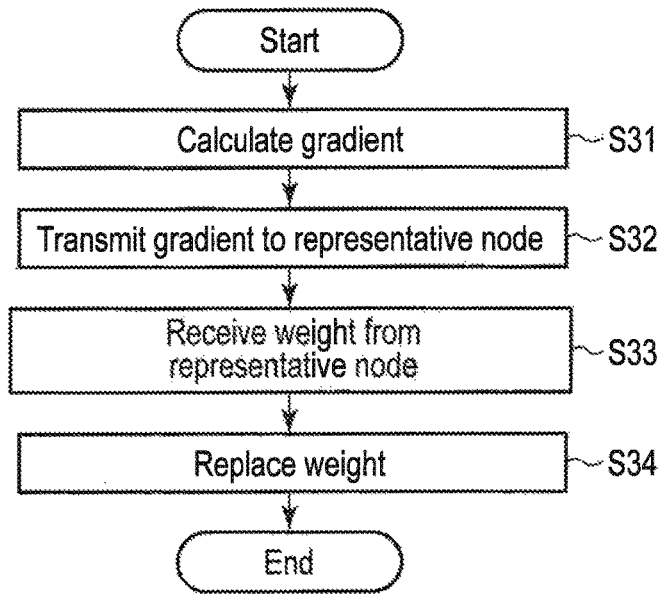
FIG. 9 is a flowchart of an example of a process of non-representative nodes.

Note that, although this is not shown, the process of FIG. 9 is performed repeatedly while the process of FIG. 7 is continued.

As described above, in group 1, the gradients of all worker nodes 30 of group 1 are gathered to the representative node 30, and an average gradient is calculated in the representative node 30. In that case, for example, a collective communication algorithm which is referred to as Reduce (MPI_Reduce) defined by Message Passing Interface (MPI) can be used to effectively perform the transmission of gradient to the representative node 30 from the non-representative node 30 and the calculation process of the average gradient (sum of gradients of all worker nodes 30). Here, the case where MPI_Reduce is used is explained; however, a different process equivalent to MPI_Reduce may be used instead.

In this example, the process of group 1 (representative node 30 and non-representative node 30) is explained, and a similar process is performed in group 2 (representative node 40 and non-representative node 40).

As described above, in the present embodiment, the system includes a plurality of worker nodes 30 (representative node and non-representative nodes) of group 1 and a plurality of worker nodes (representative node and non-representative nodes) 40 of group 2. When the worker nodes 30 perform nth parallel distributed processing using an objective function as a reference, for example, the representative node (first node) 30 of group 1 calculates a first gradient to update a first weight of objective function to a second weight, and the non-representative node (second node) 30 of group 1 calculates a second gradient to update the first weight of objective function to the second weight.

On the other hand, when the worker nodes 40 perform mth parallel distributed processing in non-synchronization manner with the parallel distributed processing by the worker nodes 30, for example, the representative node (third node) 40 of group 2 calculates a third gradient to update a third weight of objective function to a fourth weight, and the non-representative node (fourth node) 40 of group 2 calculates a fourth gradient to update the third weight of objective function to the fourth weight.

Here, in the present embodiment, if the calculation of gradient by group 1 (representative node 30 and non-representative node 30) is faster than the calculation of gradient by group 2 (representative node 40 and non-representative node 40), the second weight updated from the first weight is further updated in n+1th parallel distributed processing by group 1 using the first and second gradients, and the fourth weight updated from the third weight is further undated in m+1th parallel distributed processing by group 2 using the first to fourth gradients.

On the other hand, if the calculation of gradient by group 2 (representative node 40 and non-representative node 40) is faster than the calculation of gradient by group 1 (representative node 30 and non-representative node 30), the second weight updated from the first weight is further updated in n+1th parallel distributed processing by group 1 using the first to fourth gradients, and the fourth weight updated from the third weight is further updated in m+1th parallel distributed processing by group 2 using the third and fourth gradients.

As describe above, in the present embodiment, the worker nodes 30 and 40 are divided into a plurality of groups (group 1 and group 2), and parallel distributed learning processing by Synchronous-SGD is performed in groups as a first level. In the first level, since synchronization is performed in each group, costs for synchronization and batch size can be suppressed as compared to a case where the worker nodes 30 and 40 are all synchronized for processing.

Furthermore, in the second level, parallel distributed learning processing is performed between representative nodes of the groups in the first level through the batch size independent parallel method, In the second level, the representative nodes do not need to work in synchronization, and thus, a high throughput can be obtained.

That is, in the present embodiment, since, for example, Synchronous-SGD and the batch size independent parallel method are combined in levels, a high scalability in parallel distributed learning processing can be achieved, and the parallel distributed learning processing with greater parallel number can be performed.

Now, FIG. 10 shows a time (learning time) required to obtain a predetermined generalization performance of each learning method.

FIG. 10 shows, as learning methods, non-parallel distributed method (single node learning method), Synchronous-SGD, batch size independent parallel method, and the method of the present embodiment (Synchronous-SGD+ batch size independent parallel method).

As shown in FIG. 10, if a learning time required to obtain a predetermined generalization performance in a learning process through a non-parallel distributed method (hereinafter referred to as learning time of non-parallel distributed method) is given 1.0, a learning time required to obtain a predetermines generalization performance in a learning process through a parallel distributed learning processing by Synchronous-SGD (hereinafter referred to as learning time of Synchronous-SGD) is given 0.6.

Similarly, if the learning time of non-parallel distributed method is given 1.0, a learning time required to obtain a predetermined generalization performance in parallel distributed learning processing through a batch size independent parallel method (hereinafter referred to as learning time of batch size independent parallel method) is given 0.5.

As compared to these examples, in the method of the present embodiment (parallel distributed method in levels), theoretically, the upper limits of each scalability of Synchronous-SGD and the batch size independent parallel method are multiplied as the scalability achieved thereby.

Specifically, a learning time required to obtain a predetermined generalization performance in the parallel distributed learning processing of the method of the present embodiment (a ratio of learning time thereof to a learning time of non-parallel distributed method) is a multiplied value of a ratio of the learning time of Synchronous-SGD to the learning time of non-parallel distributed method (0.6) and a ratio of the of learning time of batch size independent parallel method to the learning time of non-parallel distributed method (0.5), that is, 0.3.

As can be understood from the above, when Synchronous-SGD is used, a predetermined generalization performance can be achieved in 60% of the learning time required in the non-parallel distributed method, and when the batch size independent parallel method is used, a predetermined generalization performance is achieved in 50% of the learning time required in the non-parallel distributed method, and when the method of the present embodiment is used, a predetermined performance can be achieved in only 30% of the learning time required in the non-parallel distributed method.

Therefore, in the present embodiment, a high scalability can be achieved as compared to a case where the parallel distributed learning processing by Synchronous-SGD or parallel distributed learning processing by batch size independent parallel method is simply performed.

Note that, in the present embodiment, the second weight is calculated using a fifth gradient calculated from the first gradient calculated by the representative node 30 of group 1 and the second gradient calculated by the non-representative node 30 of group 1 (for example, the average value of the first and second gradients). Similarly, the fourth weight is calculated using a sixth gradient calculated from the third gradient calculated by the representative node 40 of group 2 and the fourth gradient calculated by the non-representative node 40 of group 2 (for example, the average value of the third and fourth gradients).

Furthermore, in the present embodiment, the second weight and the fourth weight are calculated in the server node 20 which is communicatively connected to the representative node 30 of group 1 and the representative node 40 of group 2.

When the second weight is calculated in the server node 20, the server node 20 transmits the second weight to the representative node 30 of group 1 and the representative node 30 transmits the second weight to the non-representative node 30. In the present embodiment, with such a structure, the weights of the representative node 30 and the non-representative node 30 of group 1 can be updated to the weight calculated by the server node 20.

Furthermore, when the fourth weight is calculated in the server node 20, the server node 20 transmits the fourth weight to the representative node 40 of group 2 and the representative node 40 transmits the fourth weight to the non-representative node 40. In the present embodiment, with such a structure, the weights of the representative node 40 and the non-representative node 40 or group 2 can be updated to the weight calculated by the server node 20.

Note that, in the present embodiment, if the calculation of gradient by group 1 is faster than the calculation of gradient by group 2, the weight is updated in n+1th parallel distributed processing by group 1 using the first and second gradients, and the weight is further updated in m+1th parallel distributed processing by group 2 using the first to fourth gradients.

Here, a case where "the calculation of gradient by group 1 is faster than the calculation of gradient by group 2" includes a case where the server node 20 receives a gradient calculation result of group 1 (gradient transmitted from the representative node 30 of group 1) before receiving a gradient calculation result of group 2 (gradient transmitted from the representative node 40 of group 2).

That is, if the server node 20 receives the gradient calculation result of group 1 before receiving the gradient calculation result of group 2, for example, the weight is updated using the gradient calculation result of group 1 (that is, the first and second gradients) in the n+1th parallel distributed processing by group 1 (a later parallel distributed processing), and the weight is further updated using the gradient calculation result of group 1 (and the weight updated based thereon) and the gradient calculation result of group 2 (that is, the first to fourth gradients) in the m+1th parallel distributed processing by group 2.

Furthermore, in the present, embodiment, if the calculation of gradient by group 2 is faster than the calculation of gradient by group 1, the weight is updated in m+1th parallel distributed processing by group 2 using the third and fourth gradients, and the weight is further updated in n+1th parallel distributed processing by group 1 using the first to fourth gradients.

Here, a case where "the calculation of gradient by group 2 is faster than the calculation of gradient by group 1" includes a case where the server node 20 receives a gradient calculation result of group 2 (gradient transmitted from the representative node 40 of group 2) before receiving a gradient calculation result of group 1 (gradient transmitted from the representative node 30 of group 1).

That is, if the server node 20 receives the gradient calculation result of group 2 before receiving the gradient calculation result of group 1, for example, the weight is updated using the gradient calculation result of group 2 (that is, the third and fourth gradients) in the m+1th parallel distributed processing by group 2 (a later parallel distributed processing), and the weight is further updated using the gradient calculation result of group 2 (and the weight updated based thereon) and the gradient calculation result of group 1 (that is, the first to fourth gradients) in the n+1th parallel distributed processing by group 1.

That is, in the present embodiment, the update of the weight may be performed not on the basis of the order of the gradient calculation processes by the groups (which group can perform the gradient calculation process faster) but on the basis of the order of reception of the gradient calculation results from the groups by the server node 20 (which result is received by the server node 20 faster).

Note that, as described above, in Synchronous-SGD, the worker nodes 30 of group 1 performs the process in synchronization, for example; however, if a difference of process performances of the worker nodes 30 (process speeds based on the performances) is great, the process speed of group 1 is influenced by the process speed of the worker node 30 of low process performance (that is, the process speed of the worker node 30 of low process performance becomes dominant). The same applies to group 2.

Therefore, the process speeds of worker nodes of the same group are adjusted to be substantially the same. Specifically, a difference of process speeds between the worker nodes 30 of group 1 (representative node 30 and non-representative nodes 30) is set to a first threshold or less, and a difference of process speeds between the worker nodes 40 of group 2 (representative node 40 and non-representative nodes 40) is set to a second threshold or less. Note that the first threshold and the second threshold may be the same value or different values.

Furthermore, as shown in FIG. 11, if the process speed of the worker nodes 40 of group 2 is slower than the process speed of the worker nodes 30 of group 1, for example, the number of the worker nodes 30 of group 1 may be set to be less than the number of the worker nodes 40 of group 2. Note that, a case where the process speed of the worker nodes 40 of group 2 is slower than the process speed of the worker nodes 30 may include a case where an average value of the process speeds of the worker nodes 40 is less than an average value of the process speeds of the worker nodes 30, or a case where the slowest process speed of the process speeds of the worker nodes 40 is slower than the slowest process speed of the process speeds of the worker nodes 30. Furthermore, the process speed of each worker node may be calculated from a hardware performance or the like of the worker node, for example.

Furthermore, if the process speed of the worker nodes 40 of group 2 is slower than the process speed of the worker nodes 30 of group 1, the process amount of group 2 in the parallel distributed processing (that is, training data allocated to group 2) is set to be less than the process amount of group 1 (that is, training data allocated to group 1). In that case, the number of worker nodes 30 of group 1 and the number of worker nodes 40 of group 2 may be the same.

That is, with the structure described above, a process time required in each group can be substantially the same (that is, influence caused by the difference in process speeds can be canceled) by adjusting the number of worker nodes of each group or the process amount (workload) of each group.

In the present embodiment, the server node 20, each of the worker nodes 30, and each of the worker nodes 40 are realized in a single device (machine) (that is, each node and the device is in relationship of one-to-one); however, each node may be achieved as a process or a thread executed in one device. That is, the entire system of the present embodiment (server node 20, worker nodes 30, and worker nodes 40) can be achieved by a single device. Furthermore, the system of the present embodiment may be achieved by a plurality of devices number of which is different from the number of nodes.

That is, in the present embodiment, one node may be one computer (server), or a plurality of nodes may be mounted on one computer, or one node may be implemented by a plurality of computers. Note that, in the present embodiment, as described above, two or more groups can be included in one system, and two or more nodes can be included in one group.

Furthermore, in the present embodiment, Asynchronous-SGD which is a non-synchronized parallel distributed learning method is explained as a batch size independent parallel method; however, other methods such as Elastic Averaging SGD may be adopted.

Furthermore, in the present embodiment, different methods (algorithms) of parallel distributed learning processing are used between the first level and the second level; however, depending on algorithms to be combined, the parallel distributed learning processing may be performed in three or more levels.

Second Embodiment

Now, the second embodiment will be explained. Note that the system of the present embodiment is configured to perform different learning processes in some levels as in the first embodiment described above.

That is, parallel distributed processing of mini batch method by Synchronous-SGD in each group including a plurality of worker nodes is performed in the first level, and parallel distributed processing of batch size independent method (non-synchronization parallel distributed method) is performed between the representative nodes of groups in the second level.

Figure 12:
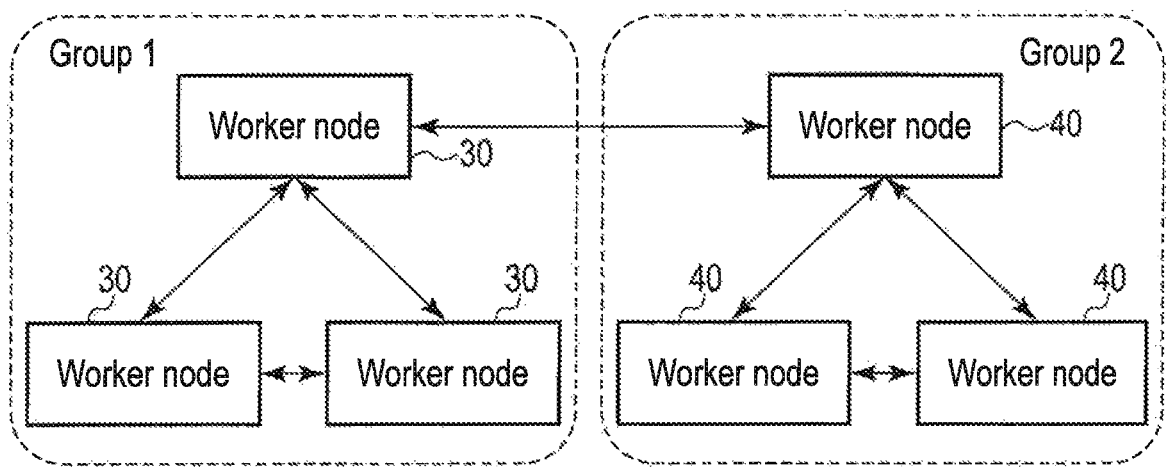
FIG. 12 shows an example of the structure of a system of a second embodiment.

FIG. 12 shows an example of the structure of the system of the present embodiment (hereinafter referred to as present system). As shown in FIG. 12, the present system 10 includes a plurality of worker nodes 30 and a plurality of worker nodes 40.

In the first embodiment described above, a server node 20 is included; however, the present embodiment does not include a server node 20, and in this respect, the present embodiment is different from the first embodiment. Note that the worker nodes 30 are included in group 1 and the worker nodes 40 are included in group 2 as in the first embodiment described above.

One worker node 30 of the worker nodes 30 of group 1 (hereinafter referred to as representative node of group 1) is communicatively connected to one worker node 40 of the worker nodes 40 of group 2 (hereinafter referred to as representative node of group 2).

Note that, in the worker nodes 30, the worker nodes 30 other than the representative node 30 of group 1 will be referred to as non-representative nodes 30 of group 1. Similarly, in the worker nodes 40, the worker nodes 40 other than the representative node 40 of group 2 will be referred to as non-representative nodes 40 of group 2.

In the present embodiment, in the first level, parallel distributed learning processing is performed by Synchronous-SGD in group 1 (worker nodes 30) and group 2 (worker nodes 40). Furthermore, in the second level, parallel distributed learning processing of batch size independent parallel distributed method is performed between the representative node 30 of group 1 and the representative node 40 of group 2.

Note that, while FIG. 12 shows an example in which three worker nodes are included in each of groups 1 and 2, the number of worker nodes may be two or more in each of the groups 1 and 2. Furthermore, while FIG. 12 shows only two groups (groups 1 and 2), the number of groups may be three or more in the present system.

The system structure of the worker nodes 30 and 40 is similar to the first embodiment, and thus, the detailed explanation thereof will be omitted.

Hereinafter, an example of functional structure of the representative node 30 of group 1 of the worker nodes 30 and 40 will be explained. Note that the functional structure of the representative node 30 of group 1 of the present embodiment will be explained with reference to FIG. 6 for easier understanding, and the parts different from the representative node 30 of group 1 of the first embodiment will be mainly explained.

As shown in FIG. 6, the representative node 30 includes a reception controller 31, training data storage 32, weight storage 33, calculator 34, and transmission controller 35.

The reception controller 31 receives a gradient calculated in the non-representative nodes 30 of group 1 therefrom.

The training data allocated to the representative node 30 of group 1 are stored in the training data storage 32. The weight of objective function is stored in the weight storage 33.

The calculator 34 calculates the gradient to update the weight of objective function using the training data stored in the training data storage 32 and the weight stored in the weight storage 33.

The calculator 34 updates the weight using the gradient received by the reception controller 31 (that is, gradient calculated by the non-representative nodes 30), gradient calculated by the calculator 34, and the weight stored in the weight storage 33. In that case, the calculator 34 calculates the weight after update using the above Formula (1). The weight calculated by the calculator 34 is replaced with the weight stored in the weight storage 33. Thus, the weight of the representative node 30 of group 1 is updated.

The transmission controller 35 transmits the gradient calculated by the calculator 34 to the non-representative nodes 30 of group 1.

Furthermore, the transmission controller 35 transmits the gradient calculated by the non-representative nodes 30 of group 1 and gradient calculated by the calculator 34 (that is, gradient calculated by the representative node 30) to a representative node of another group (for example, group 2).

Here, the gradient calculated by the non-representative nodes 30 of group 1 and the gradient calculated by the representative node 30 of group 1 are transmitted to the representative node 40 of group 2 as mentioned above, and similarly, a gradient calculated by the non-representative nodes 40 of group 2 and a gradient calculated by the representative node 40 of group 2 are transmitted to the representative node 30 of group 1.

When the gradient calculated by the non-representative nodes 40 of group 2 and the gradient calculated by the representative node 40 are received by the representative node 30 of group 1 (reception controller 31), the calculator 34 updates the weight stored in the weight storage 33 using the gradients, and the transmission controller 35 transmits the gradients to the non-representative nodes 30 of group 1.

Now, an example of functional structure of the non-representative node 30 of group 1 will be explained. Note that the functional structure of the non-representative node 30 of group 1 of the present embodiment will be explained with reference to FIG. 6 for easier understanding, and the parts different from the representative node 30 of group 1 of the first embodiment will be mainly explained.

The non-representative node 30 of group 1 includes, as in the representative node 30 of group 1, a reception controller 31, training data storage 32, weight storage 33, calculator 34, and transmission controller 35.

The reception controller 31 receives a gradient calculated in the representative node 30 of group 1 and a gradient calculated in other non-representative nodes 30 from the representative node 30 and the non-representative nodes 30.

The training data allocated to the non-representative node 30 of group 1 are stored in the training data storage 32. The weight of objective function is stored in the weight storage 33.

The calculator 34 calculates the gradient to update the weight of objective function using the training data stored in the training data storage 32 and the weight stored in the weight storage 33.

The calculator 34 updates the weight using the gradients received by the reception controller 31 (that is, gradient calculated by the representative node 30 and the gradient calculated by other non-representative nodes 30), gradient calculated by the calculator 34, and the weight stored in the weight storage 33. In that case, the calculator 34 calculates the weight after update using the above Formula (1). The weight calculated by the calculator 34 is replaced with the weight stored in the weight storage 33. Thus, the weight of the non-representative node 30 of group 1 is updated.

Note that, as described above, when the gradient calculated by the non-representative nodes 40 of group 2 and the gradient calculated by the representative node 40 of group 2 are transmitted by the transmission controller 35 included in the representative node 30 of group 1, the gradients are received by the reception controller 31 and used for update of the weight.

While the representative node 30 and non-representative nodes 30 of group 1 are explained, in the present embodiment, the same functional structure is applied to the representative node 40 and the non-representative nodes 40 of group 2. Thus, when the functional structure of the representative node 40 and the non-representative nodes 40 of group 2 are explained below, FIG. 6 will be used for reference.

Hereinafter, an example of the process flow of the present system will be explained with reference to the sequence chart of FIG. 13. Here, the process between group 1 (worker nodes 30) and group 2 (worker nodes 40) will be mainly explained, and the process of each worker node of each of the groups (group 1 and group 2) will be explained later.

In this example, for example, a weight W10 is stored in the weight storage 33 included in each of the worker nodes 30 of group 1, and a weight W20 is stored in the weight storage 33 included in each of the worker nodes 40 of group 2. Note that the weight W10 and the weight W20 may be the same value-or difference values.

Initially, in group 1 (the worker nodes 30 thereof), a gradient calculation process by Synchronous-SGD is performed (step S41). Through the gradient calculation process, each of the worker nodes 30 of group 1 calculates a gradient to update a weight of objective function using the training data stored in the training data storage 32 included in the worker node 30 and the weight W10 stored in the weight storage 33. Note that the worker nodes 30 of group 1 perform the gradient calculation process in synchronization.

Each of the worker nodes 30 calculates a new weight (hereinafter referred to as weight W11) using the gradient calculated in step S41 and the weight W10 stored in the weight storage 33 included in the worker node 30. Thus, the weight W10 stored in the weight storage 33 included in each of the worker nodes 30 is updated to the calculated weight W11 (step S42).

Here, when the process of step S42 is performed, the gradient calculated in step S41 is transmitted from the representative node 30 of group 1 to the representative node 40 of group 2 (step S43).

The representative node 40 of group 2 receives the gradient transmitted in step S43. The received gradient is shared in the worker nodes 40 of group 2. Thus, each of the worker nodes 40 calculates a new weight (hereinafter referred to as weight W21) using the gradient received by the representative node 40 of group 2 and the weight W20 stored in the weight storage 33 included in the worker node 40. Thus, the weight W20 stored in the weight storage 33 included in the worker node 40 is updated to the calculated weight W21 (step S44).

Then, in group 2 (the worker nodes 40 thereof), as in group 1, a gradient calculation process by Synchronous-SGD) is performed (step S45). Through the gradient calculation process, each of the worker nodes 40 of group 2 calculates a gradient to update a weight of objective function using the training data stored in the training data storage 32 included in the worker node 40 and the weight W21 stored in the weight storage 33. Note that the worker nodes 40 of group 2 perform the gradient calculation process in synchronization.

Each of the worker nodes 40 calculates a new weight (hereinafter referred to as weight W22) using the gradient calculated in step S45 and the weight W21 stored in the weight storage 33 included in the worker node 40. Thus, the weight W21 stored in the weight storage 33 included in each of the worker nodes 40 is updated to the calculated weight W22 (step S46).

Here, when the process of step S46 is performed, the gradient calculated in step S45 is transmitted from the representative node 40 of group 2 to the representative node 30 of group 1 (step S47).

The representative node 30 of group 1 receives the gradient transmitted in step S47. The received gradient is shared in the worker nodes 30 of group 1. Thus, each of the worker nodes 30 calculates a new weight (hereinafter referred to as weight W12) using the gradient received by the representative node 30 and the weight W11 stored in the weight storage 33 included in the worker node 30. Thus, the weight W11 stored in the weight storage 33 included in the worker node 30 is updated to the calculated weight W12 (step S48).

Figure 13:
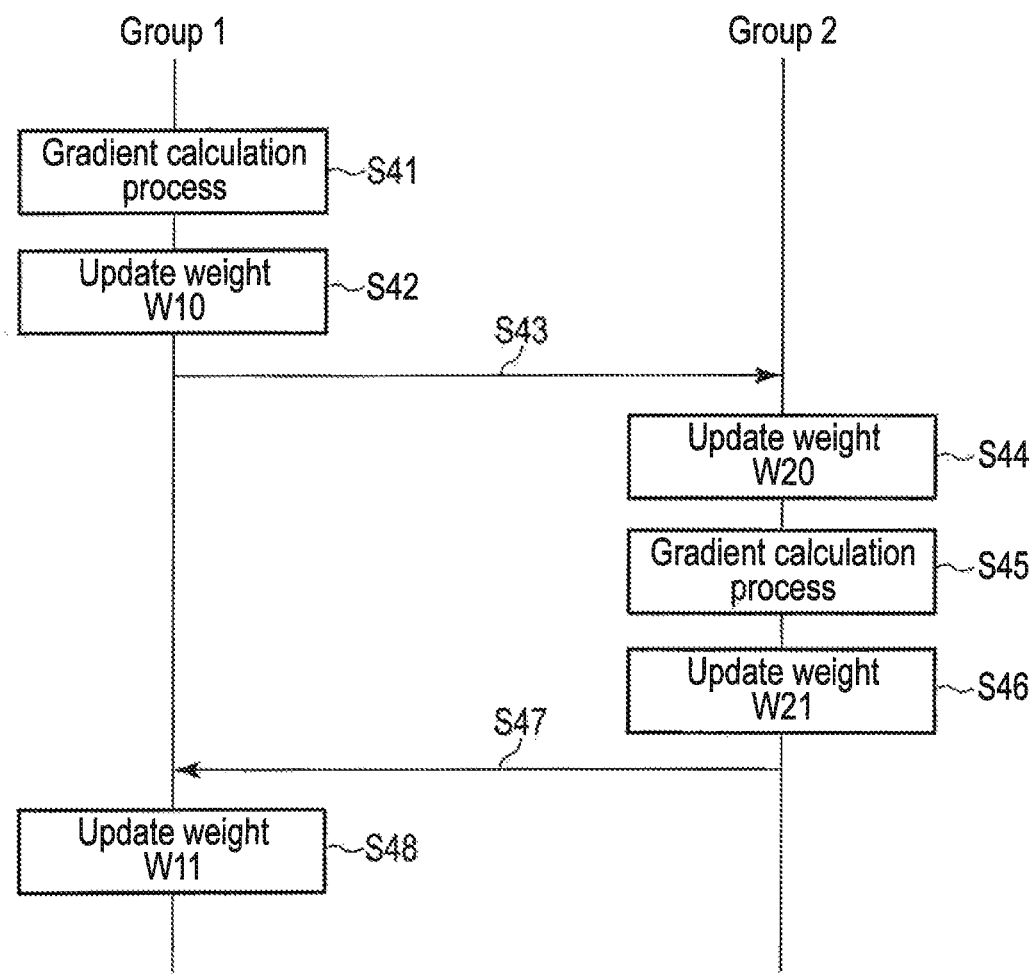
FIG. 13 is a sequence chart of an example of a process of the system.

FIG. 13 shows steps S41 to S48; however, the process of FIG. 13 is performed repeatedly until the gradient calculation process (that is, parallel distributed learning process) is performed to all of the training data stored in the training data storage 32 of each of the worker nodes 30 and 40.

As described above, in the present embodiment, the process is performed in groups 1 and 2 in synchronization while the process between group 1 and group 2 is performed in non-synchronization.

That is, in step S43 of FIG. 13, the gradient calculated in step S41 is transmitted from the representative node 30 of group 1 to the representative node 40 of group 2, and a timing of transmitting the gradient is after the process of steps S41 and S42, for example, and is not influenced by the process of group 2 (the worker nodes 40 thereof). Similarly, a timing of transmitting the gradient in step S47 of FIG. 13 is after the process of steps S45 and S46, for example, and is not influenced by the process of group 1 (the worker nodes 30 thereof).

Hereinafter, the processes of the representative node and the non-representative nodes of each group when the process of FIG. 13 is performed will be explained.

Initially, an example of the process flow of the representative node will be explained with reference to the flowchart of FIG. 14. Here, the process flow of the representative node 30 of group 1 will be explained.

The calculator 34 included in the representative node 30 of group 1 calculates a gradient using the training data stored in the training data storage 32 and the weight (for example, weight W11) stored in the weight storage 33 (step S51), Hereinafter, the gradient calculated by the representative node 30 will be referred to as gradient of representative node 30.

Note that, when the representative node 30 of group 1 performs the process of step S51, the non-representative nodes 30 of group 1 calculate a gradient in synchronization with the representative node 30 as described later. Hereinafter, the gradient calculated by the non-representative nodes 30 will be referred to as gradient of non-representative node 30.

In that case, the gradient of representative node 30 of group 1 and the gradient of the non-representative node 30 are distributed in group 1 (step S52). That is, the gradient of representative node 30 of group 1 is transmitted from the representative node 30 to each of the non-representative nodes 30, and the gradient of each of the non-representative nodes 30 of group 1 is received by the representative node 30 of group 1 (the reception controller 31 therein).

Then, the calculator 34 calculates an average value of the gradient calculated in step S51 (gradient of representative node 30) and the gradient received by the reception controller 31 (gradient of non-representative node 30) (step S53). Hereinafter, the average value of the gradients calculated in step S53 will be referred to as average gradient of group 1.

When the process of step S53 is performed, the calculator 34 calculates a new weight using the average gradient of group 1, and updates the weight stored in the weight storage 33 to the calculated weight (for example, weight W11) (step S54). Thus, the weight representative node 30 of group 1 is updated to the weight using the gradient calculated by each of the worker nodes 30 of group 1.

When the process of step S54 is performed, the transmission controller 35 transmits the average gradient of group 1 to the representative node 40 of group 2 (step S55).

The above process of steps S51 to S55 is performed by the representative node 30 of group 1 in steps S41 to S43 shown in FIG. 13.

Figure 14:
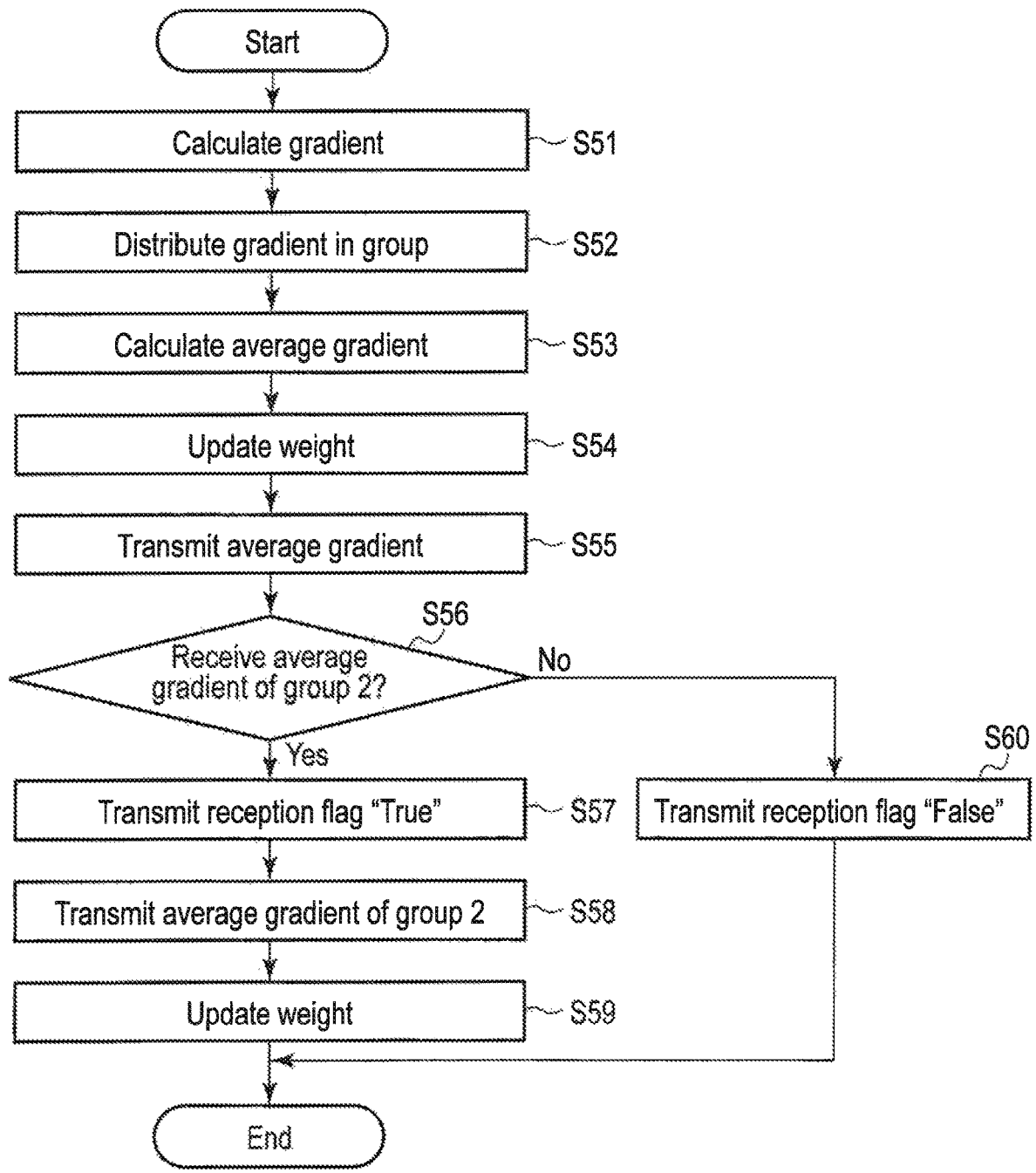
FIG. 14 is a flowchart of an example of a process of a representative node.

Note that, as described later, the process of FIG. 14 is performed similarly by the representative node 40 of group 2. Thus, for example, if the process corresponding step S55 is performed by the representative node 40 of group 2, the reception controller 31 included in the representative node 30 of group 1 can receive an average gradient of group 2.

Here, whether or not the reception controller 31 receives the average gradient of group 2 is determined (step S56).

If it is determined that the average gradient of group 2 is received (YES in step S56), the transmission controller 35 transmits a reception flag "True" to the non-representative nodes 30 of group 1 (step S57).

Furthermore, the transmission controller 35 transmits the average gradient of group 2 received by the reception controller 31 to the non-representative nodes 30 of group 1 (step S58).

When the process of step S58 is performed, the calculator 34 calculates a new weight using the average gradient of group 2, and updates the weight stored in the weight storage 33 to the calculated weight (for example, weight W12) (step S59). Thus, the weight of representative node 30 of group 1 is updated to the weight using the gradient calculated by each of the worker nodes 40 of group 2.

The above process of steps S56 to S59 is performed by the representative node 30 of group 1 in step S48 shown in FIG. 13.

Note that, if it is determined that the average gradient of group 2 is not received in step S56 (NO in step S56), the transmission controller 35 transmits a reception flag "False" to the non-representative nodes 30 (step S60).

Through the above process of FIG. 14, the weight of the representative node 30 of group 1 is updated using the gradient calculated by each of the worker nodes 30 of group 1 (average gradient of group 1) and is further updated using the gradient calculated by each of the worker nodes 40 of group 2 (average gradient of group 2).

Note that, although this is not shown, the process of FIG. 14 is performed repeatedly while the process of FIG. 13 is continued.

Now, an example of the process flow of non-representative node will be explained with reference to the flowchart of FIG. 15. Here, the process flow of non-representative node 30 of group 1 will be explained.

The calculator 34 included in the non-representative node 30 calculates a gradient using the training data stored in the training data storage 32 and the weight (for example, weight W10) stored in the weight storage 33 in synchronization with the calculation of gradient in the representative node 30 (step S71).

In that case, the gradient of representative node 30 and the gradient calculated in step S71 (gradient of the non-representative node 30) are distributed in group 1 (step S72). That is, the gradient of representative node 30 of group 1 is transmitted from the non-representative node 30 to the representative node 30 (and other non-representative nodes 30) of group 1, and the gradient of the representative node 30 (and gradients of other non-representative nodes 30) are received by the non-representative node 30 (the reception controller 31 therein).

Then, the calculator 34 calculates an average value of the gradient calculated in step S71 (gradient of non-representative node 30) and the gradients received by the reception controller 31 (gradients of representative node 30 and other non-representative nodes 30) (step S73). Note that the average value of the gradients calculated in step S73 corresponds to the average gradient of group 1 calculated in step S53 of FIG. 14.

When the process of step S73 is performed, the calculator 34 calculates a new weight using the average gradient of group 1, and updates the weight stored in the weight storage 33 to the calculated weight (for example, weight W11) (step S74). Thus, the weight of non-representative node 30 of group 1 is updated to the weight using the gradient calculated by each of the worker nodes 30 of group 1.

The above process of steps S71 to S74 is performed by the non-representative node 30 of group 1 in steps S41 to S42 shown in FIG. 13.

Here, the reception flag transmitted from the representative node 30 in step S57 or S60 of FIG. 14 is received by the reception controller 31 included in the non-representative node 30.

In that case, whether or not the reception controller 31 receives the reception flag "True" is determined (step S76).

If it is determined that the reception flag "True" is received (YES in step S76), the reception controller 31 receives the average gradient of group 2 transmitted from the representative node 30 of group 1 in step S58 of FIG. 14 (step S77).

When the process of step S77 is performed, the calculator 34 calculates a new weight using the average gradient of group 2, and updates the weight stored in the weight storage 33 to the calculated weight (for example, weight W12) (step S78). Thus, the weight of non-representative node 30 of group 1 is updated to the weight using the gradient calculated by each of the worker nodes 40 of group 2.

The above process of steps S75 to S78 is performed by the non-representative node 30 of group 1 in step S48 shown in FIG. 13.

Note that, if the reception flag "True" is not received in step S76 (that is, the reception flag "False" is received) (NO in step S76), the average gradient of group 2 is not received, and thus, the process of steps S77 and S78 are not performed.

Figure 15:
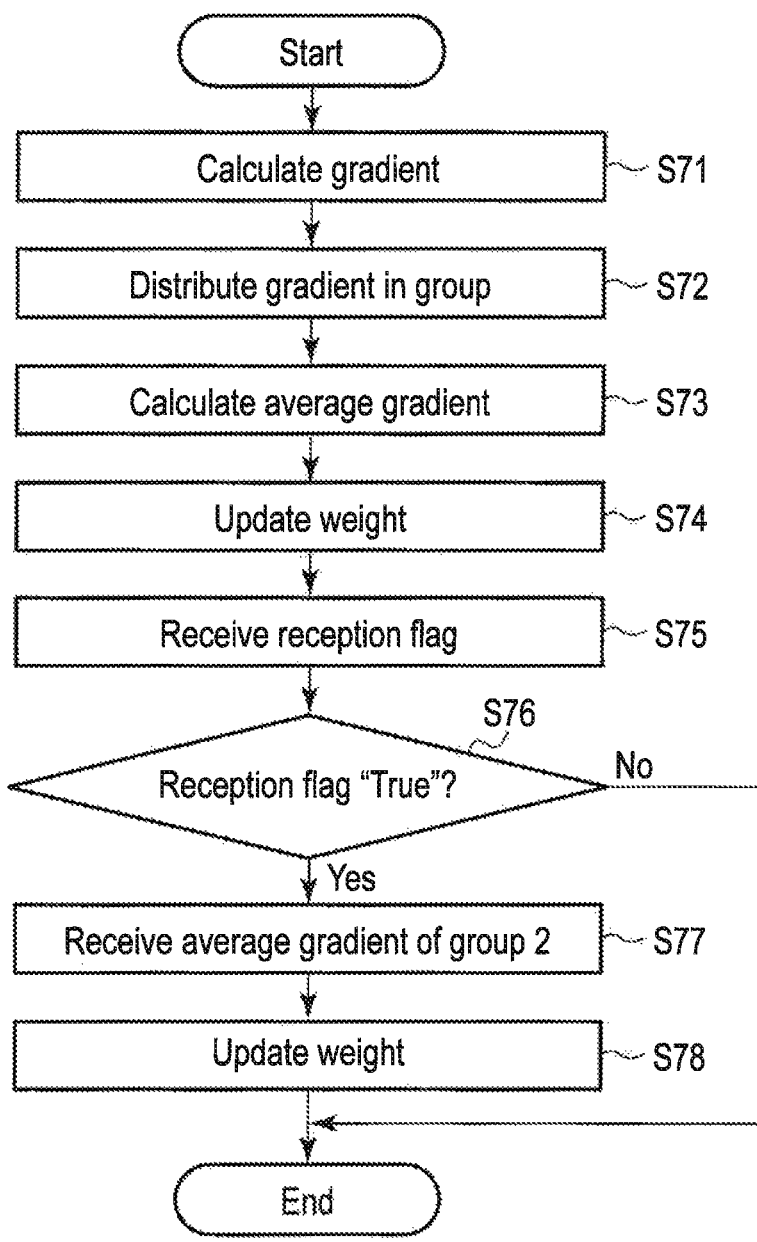
FIG. 15 is a flowchart of an example of a process of non-representative nodes.

Through the above process of FIG. 15, the weight of the non-representative node 30 of group 1 is updated using the gradient calculated by each of the worker nodes 30 of group 1 (average gradient of group 1) and is further updated using the gradient calculated by each of the worker nodes 40 of group 2 (average gradient of group 2).

Note that, although this is not shown, the process of FIG. 15 is performed repeatedly while the process of FIG. 13 is continued.

As described above, in group 1, the gradients are shared between all worker nodes 30 of group 1, and an average gradient is calculated in each worker node 30 of group 1. In that case, a collective communication algorithm which is referred to as Allreduce (MPI_Allreduce) defined by MPI can be used to effectively perform the transmission of gradient between the worker nodes 30 and the calculation process of the average gradient (sum of gradients of all worker nodes 30). Here, the case where MPI_Allreduce is used is explained; however a different process equivalent to MPI_Allreduce may be used instead.

In this example, the process of the representative node 30 and the non-representative nodes 30 of group 1 is explained, and a similar process is performed as to the representative node 40 and the non-representative nodes 40 of group 2.

Here, in the present embodiment, if the calculation of gradient by group 1 (representative node 30 and non-representative node 30) is faster than the calculation of gradient by group 2 (representative node 40 and non-representative node 40), the gradient calculated in group 1 is transmitted to the representative node 40 of group 2. In that case, the representative node 40 of group 2 (and non-representative nodes 40) calculate (update) the weight in the parallel distributed learning processing using the average gradient of group 1.

Furthermore, if the calculation of gradient by group 2 is faster than the calculation of gradient by group 1, the gradient calculated by group 2 is transmitted to the representative node 30 of group 1. In that case, the representative node 30 of group 1 (and non-representative nodes 30) calculate (update) the weight in the parallel distributed learning processing using the average gradient of group 2.

As describe above, in the present embodiment, the worker nodes 30 and 40 are divided into a plurality of groups (group 1 and group 2), and parallel distributed learning processing by collective communication type Synchronous-SGD is performed in groups as a first level. In the first level, the gradient is shared between the worker nodes of the groups, an average gradient is calculated in each of the worker nodes, and the weight is updated. In the first level, costs for synchronization and batch size can be suppressed.

Furthermore, in the second level, parallel distributed learning processing is performed between representative nodes of the groups in the first level through the batch size independent parallel method. In the second level, the representative nodes do not need to work in synchronization, and thus, a high throughput can be obtained.

That is, in the present embodiment, as in the first embodiment, since Synchronous-SGD and the batch size independent parallel method, for example, are combined in levels, a high scalability in parallel distributed learning processing can be achieved, and the parallel distributed learning processing with greater parallel number can be performed.

Note that, in the present embodiment, a case where "the calculation of gradient by group 1 is faster than the calculation of gradient by group 2" includes a case where the representative node 40 of group 2 receives a gradient calculated by group 1 (gradient calculation result from group 1) before calculation of gradient by group 2.

That is, if the representative node 40 of group 2 receives the gradient calculated by group 1 before calculation of gradient by group 2, for example, in the group 1, the weight is updated using the gradient calculated by group 1 (that is, the first and second gradients). On the other hand, in group 2, after the update of the weight using the gradients calculated by group 1, the weight is further updated using the gradients calculated by group 2 (that is, the third and fourth gradients). In other words, if the representative node 40 of group 2 receives the gradient calculated by group 1 before the calculation of gradient by group 2, the weight is updated using the first and second gradients in group 1 and the weight is updated using the first to fourth gradients in group 2.

Furthermore, in the present embodiment, a case where "the calculation of gradient by group 2 is faster than the calculation of gradient by group 1" includes a case where the representative node 30 of group 1 receives a gradient calculated by group 2 (gradient calculation result from group 2) before calculation of gradient by group 1.

That is, if the representative node 30 of group 1 receives the gradient calculated by group 2 before calculation of gradient by group 1, for example, in the group 2, the weight is updated using the gradient calculated by group 2 (that is, the third and fourth gradients). On the other hand, in group 1, after the update of the weight using the gradients calculated by group 2, the weight is further updated using the gradients calculated by group 1 (that is, the first and second gradients). In other words, if the representative node 30 of group 1 receives the gradient calculated by group 2 before the calculation of gradient by group 1, the weight is updated using the third and fourth gradients in group 2 and the weight is updated using the first to fourth gradients in group 1.

That is, in the present embodiment, the update of the weight may be performed not on the basis of the order of the gradient calculation processes by the groups (which group can perform the gradient calculation process faster) but on the basis of the order of reception of the gradient calculation results from the groups by the representative nodes of groups 1 and 2.

Note that, in the present embodiment, the gradient is shared between groups; however, the weight updated in each of the worker nodes in the groups may be shared between the groups.

According to at least one of the above-described embodiments, a system, program, and method which can achieve a high scalability in the parallel distributed learning processing can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
a first node and a second node of a first group;
a third node and a fourth node of a second group; and
a server node, wherein,
each of the first to fourth nodes includes a processor and stores a first weight of objective function,
the server node includes a processor,
the processor included in the first node is configured to obtain a first gradient by performing a first training process using first training data allocated to the first node and the first weight, and to transmit the first gradient to the server node,
the processor included in the second node is configured to obtain a second gradient by performing a second training process using second training data allocated to the second node and the first weight, and to transmit the second gradient to the server node,
the first training process and the second training process are performed in synchronization,
the processor included in the server node is configured to perform a first update process to update the first weight to a second weight based on an average value of the first and second gradients, and to transmit the second weight to the first node and the second node,
the second weight is stored in each of the first and second nodes,
the processor included in the third node is configured to obtain a third gradient by performing a third training process using third training data allocated to the third node and the first weight, and to transmit the third gradient to the server node,
the processor included in the fourth node is configured to obtain a fourth gradient by performing a fourth training process using fourth training data allocated to the fourth node and the first weight, and to transmit the fourth gradient to the server node,
the third training process and the fourth training process are performed in synchronization,
the processor included in the server node is configured to perform a second update process to update the second weight to a third weight based on an average value of the third and fourth gradients, and to transmit the third weight to the third node and the fourth node,
the third weight is stored in each of the third and fourth nodes, and
the first update process and the second update process are performed in non-synchronization.

2. The system of claim 1, wherein the first weight is updated using a fifth gradient calculated from the first and second gradients, and the second weight is updated using a sixth gradient calculated from the third and fourth gradients.

3. The system of claim 1, wherein, if the calculation of gradient by the processors included in the first node and the second node is faster than the calculation of gradient by the processors included in the third node and the fourth node, the first and second gradients are transmitted to the third node and the fourth node, and, the third weight is further updated using the first to fourth gradients, and
if the calculation of gradient by the processors included in the third node and the fourth node is faster than the calculation of gradient by the processors included in the first node and the second node, the third and fourth gradients are transmitted to the first node and the second node, and, the second weight is further updated using the first to fourth gradients.

4. The system of claim 1, wherein a difference of processing speed between the first node and the second node of the first group is a first threshold value or less, and a difference of processing speed between the third node and the fourth node of the second group is a second threshold value or less.

5. The system of claim 4, wherein a plurality of nodes including the first node and the second node are in the first group, a plurality of nodes including the third node and the fourth node are in the second group, and if the processing speed of the third node and the fourth node is slower than the processing speed of the first node and the second node, a first number of the plurality of nodes of the first group is less than a second number of the plurality of nodes of the second group.

6. The system of claim 4, wherein, if the processing speed of the first node and the second node is slower than the processing speed of the third node and the fourth node, an amount of processing of each of the third node and the fourth node of the second group in the parallel distributed processing is less than the amount of processing of the first node and the second node of the first group.

* * * * *